US006342096B1

(12) United States Patent
Kurabayashi

(10) Patent No.: US 6,342,096 B1
(45) Date of Patent: Jan. 29, 2002

(54) INK-JET RECORDING METHOD AND METHOD FOR IMPROVING TONE PROPERTY OF IMAGE

(75) Inventor: Yutaka Kurabayashi, Murayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/241,852

(22) Filed: Feb. 2, 1999

(30) Foreign Application Priority Data

Feb. 4, 1998 (JP) .......................................... 10-023593

(51) Int. Cl.$^7$ .............................................. C09D 11/02
(52) U.S. Cl. ................................ 106/31.27; 106/31.28; 106/31.48; 106/31.49; 106/31.5; 106/31.52; 106/31.6
(58) Field of Search ........................... 106/31.27, 31.28, 106/31.48, 31.49, 31.5, 31.52, 31.6

(56) References Cited

U.S. PATENT DOCUMENTS 5,114,477 A * 5/1992 Mort et al. ................. 106/31.9
5,614,007 A    3/1997 Kurabayashi et al. ..... 106/31.27
5,631,684 A * 5/1997 Takaide et al. ............. 347/100
5,700,314 A   12/1997 Kurabayashi et al. ..... 106/31.27
5,910,812 A * 6/1999 Yamamoto et al. ......... 347/106

FOREIGN PATENT DOCUMENTS

JP   61-59911 B2   5/1979
JP   61-59912 B2   5/1979
JP   61-59914 B2   2/1980

* cited by examiner

*Primary Examiner*—Helene Klemanski
(74) *Attorney, Agent, or Firm*—Fitzpatrick, Cella, Harper & Scinto

(57) ABSTRACT

Disclosed herein is an ink-jet recording method comprising applying a plurality of inks to a recording medium by an ink-jet system to form dual- or multi-toned image on the recording medium, wherein each of the inks permits formation of such an image on a transparent recording medium whose a* and b* values of CIELAB determined by measuring the CIELAB color space of the image on a transparent recording medium with a single pass satisfy the relationship represented by the following formula (I);

$$(a^{*2}+b^{*2})^{1/2} \leq 15 \qquad (I).$$

37 Claims, 6 Drawing Sheets

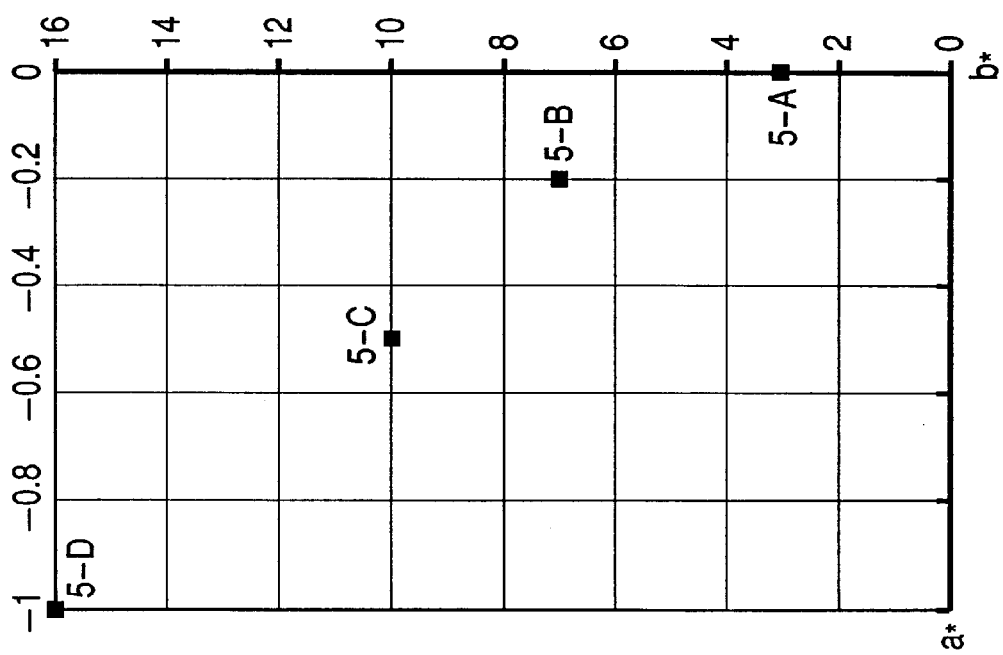

INK-JET RECORDING METHOD AND METHOD FOR IMPROVING TONE PROPERTY OF IMAGE

BACKGROUND OF THE INVENTION

1. Field of the Invention

The present invention relates to an ink-jet recording method which has high reliability and can provide an image high in optical density and good in tone representation. The ink-jet recording method according to the present invention can be preferably applied to, particularly, image forming apparatus and the like which permit the formation of images such as diagnostic images and reference images used in a medical field, in which a high optical density of image is required for a transparent base material.

2. Related Background Art

In an ink-jet recording system, an ink is ejected to apply it to a recording medium such as paper, thereby conducting recording. In particular, according to the system disclosed in Japanese Patent Publication Nos. 61-59911, 61-59912 and 61-59914, in which an electrothermal converter is used as an ejection-energy supply means to apply thermal energy to an ink so as to generate bubbles, thereby ejecting droplets of the ink, the formation of a high-density multi-orifice in a recording head can be realized with ease, and high-resolution and high-quality images can be recorded at high speed.

Water-soluble dyes are mainly used as coloring materials in the conventional inks used in the ink-jet recording system. However, the inks using a water-soluble dye as a coloring material involve a problem that when high-density printing is conducted on a transparent recording medium with such an ink, the maximum optical density of image is hard to achieve compared with the optical density of image in the wet silver salt method or the like in application to fields in which particularly a high transmission density of image is required, because the transparency of the coloring material is high.

In order to overcome such a problem as described above in the inks using a water-soluble dye as a coloring material, it is considered to use a coloring material having high hiding power, such as a pigment. When a pigment, for example, carbon black is used as a coloring material for obtaining high optical density of image, however, the so-called undertone of the pigment becomes conspicuous at a highlight portion, and its color tone becomes reddish in which the b* value in the CIELAB color space becomes relatively large, so that fine tone representation may not be achieved in some cases.

SUMMARY OF THE INVENTION

It is an object of the present invention to provide an ink-jet recording method by which the above-described problem, i.e., the problem of color tone at the highlight portion caused in the case where a pigment ink is used to obtain an image having a high optical density by the ink-jet recording system, can be solved, and an image good in tone representation can be provided.

Another object of the present invention is to provide a method for improving the tone property of a black image with a plurality of tones which is formed using a plurality of inks in accordance with an ink-jet recording method.

The above objects can be achieved by the present invention described below.

According to the present invention, there is thus provided an ink-jet recording method comprising applying a plurality of inks to a recording medium by an ink jet recording system to form a dual or multi-toned image on the recording medium, wherein each of the inks permits formation of such an image on a transparent recording medium whose a* and b* values of CIELAB determined by measuring CIELAB color space of the image on a transparent recording medium with a single pass, satisfy the relationship represented by the following formula (I):

$$(a^{*2}+b^{*2})^{1/2} \leq 15 \qquad (I).$$

According to the present invention, there is also provided a process for improving tone property of a dual toned-black image or a multi toned-black image on a transparent recording medium with a plurality of black inks by using an ink-jet recording method, wherein each of the inks permits formation of such a single toned-black image on a transparent recording medium whose a* and b* values of CIELAB determined by measuring CIELAB color space of the single toned-black images formed with respective inks with a single pass, satisfy the relationship represented by the following formula (I):

$$(a^{*2}+b^{*2})^{1/2} \leq 15 \qquad (I).$$

BRIEF DESCRIPTION OF THE DRAWINGS

FIG. 11 is a CIE La*b* color space chromaticity diagram showing hues of respective inks used in Comparative Example 1.

DESCRIPTION OF THE PREFERRED EMBODIMENTS

Figure 1:
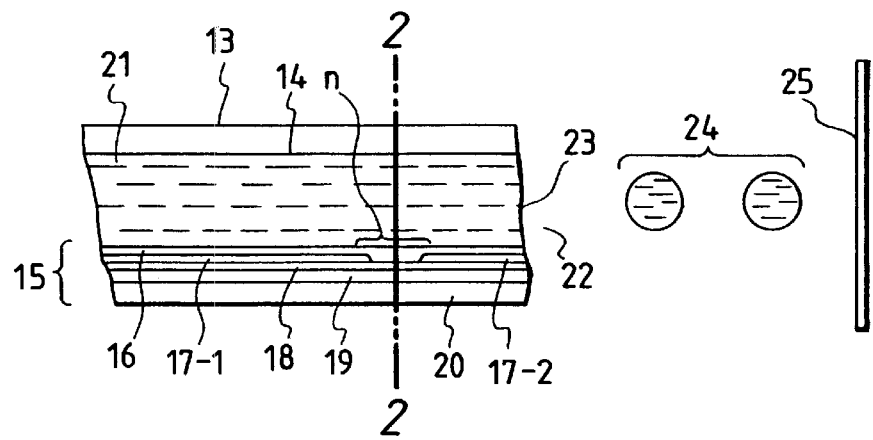
FIG. 1 is a longitudinal cross-sectional view of a head of an ink-jet recording apparatus.

The present invention will hereinafter be described in more detail with reference to the preferred embodiments of the invention.

The ink-jet recording method according to an embodiment of the present invention comprises the step of applying a plurality of, for example, black inks different from each other in concentration of coloring material to a recording medium in accordance with an ink-jet recording system to form a black image with a plurality of tones. Each of the plural black inks different in concentration of coloring material contains a pigment and a dye, and the mixing proportions of the pigment and dye in the ink are controlled in such a manner that when a 100% solid printed area is formed with the respective inks on a transparent recording medium by the ink-jet recording system, the a* and b* values in CIELAB color space of the 100% solid printed areas as measured with a single pass satisfy the relationship $$(a^{*2}+b^{*2})^{1/2} \leq 15 \qquad (I).$$

The use of such an ink-jet recording method provides a black image high in transmission density of image and good in color tone and tone representation. More specifically, when a black image with a plurality of tones is formed using the above-described ink-jet recording method, the undertone of pigment does not appear even at the highlight portion (portion lowest in optical density of image) of the black image, and so it can be prevented for the black image to look reddish.

Materials, which are constitutional requirements of the ink-jet recording method according to the present invention, will hereinafter be described specifically.

First, in a plurality of black inks different from each other in concentration of coloring material, it is preferred to contain, as a coloring material, a pigment having higher hiding power compared with dyes with a view toward solving the above-described problems involved in the prior art. It is particularly preferred to use inks containing carbon black as the pigment. Any carbon black may be used in this case. However, particularly preferable examples thereof include the following carbon blacks. Those produced in accordance with the furnace process or channel process and having such properties that the primary particle diameter is from 15 to 40 μm, the specific surface area is from 50 to 300 m²/g as measured by the BET method, the oil absorption is from 40 to 150 ml/100 g as determined by DBP, the volatile matter content is from 0.5 to 10%, and the pH is from 2 to 9 may be preferably used. Specific examples of commercially-available carbon black having such properties include No. 2300, No. 900, MCF88, No. 33, No. 40, No. 45, No. 52, MA7, MA8 and No. 2200B (all, products of Mitsubishi Chemical Industries Limited), RAVEN 1255 (product of Columbian Carbon Japan Limited), REGAL 400R, REGAL 330R, REGAL 660R and MOGUL L (all, products of CABOT Co.), and Color Black FW1, Color Black FW18, Color Black S170, Color Black S150, Printex 35 and Printex U (all, products of Degussa AG). All of them may preferably be used in the present invention.

It is preferred that a dispersing agent be used in order to uniformly disperse such carbon blacks as described above in the inks. As the dispersing agent used in this case, water-soluble resins and surfactants which have heretofore been used for dispersion of pigments may be used without any problem.

When a water-soluble resin is used as the dispersing agent in this case, it is preferred to use a resin having a weight average molecular weight ranging from 500 to 30,000, more preferably from 1,000 to 15,000. Specific examples of such a dispersing agent include block copolymers, random copolymers and graft copolymers composed of at least two monomers (with the proviso that at least one thereof is a hydrophilic monomer) selected from styrene, styrene derivatives, vinylnaphthalene, vinylnaphthalene derivatives, aliphatic alcohol esters and the like of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinylpyrrolidone, acrylamide and derivatives thereof, and salts of these copolymers. Natural resins such as rosin, shellac and starch may also be preferably used. These resins are alkali-soluble resins which and dissolve in an aqueous solution of a base. In the present invention, these water-soluble resins used as the pigment dispersing agent for uniformly dispersing carbon black may preferably be contained in a range from 0.1 to 1.5% by weight based on the total weight of the inks.

In the above-described inks used in the present invention, a pigment such as carbon black is uniformly dispersed in each ink by the dispersing agent. However, inks used in the present invention are not limited to these inks. More specifically, in the present invention, a carbon black of the type unnecessary to use any dispersing agent, which is obtained by subjecting active groups on its surface to an oxidation treatment or other surface treatment, may also be preferably used. Since the surface of the carbon black subjected to such a treatment as described above is rich in carboxyl group or sulfonic group, it may be self-dispersed in an ink without using a dispersing agent.

As examples of such a carbon black, may be mentioned carbon black (trade name: CABOJET 200; product of CABOT Co.) with sulfone group bonded to the surface thereof, which can be dispersed in water without using a dispersing agent, and carbon black (trade name: CABOJET 300; product of CABOT Co.) with carboxyl group bonded to the surface thereof, which can be dispersed in water without using a dispersing agent.

In a plurality of the black inks according to the present invention, it is preferred that a water-soluble dye be further contained as a coloring material in addition to the above-described pigment to adjust each of the inks in such a manner that when a 100% solid printed image is formed with each of the inks alone on a transparent recording medium, the a* and b* values in CIELAB color space of the respective solid printed images as measured with a single pass satisfy the relationship (I).

More specifically, as described above, when a pigment, for example, carbon black, is used as a coloring material for obtaining high optical density of image, the so-called undertone of the pigment becomes conspicuous at a highlight portion of a black image with a plurality of tones formed with an ink low in concentration of coloring material, and the color tone of the highlight portion becomes reddish, so that any black image having good tone representation may not be provided in some cases. However, this problem can be solved by adjusting the coloring materials with the above-described manner. As examples of methods for adjusting the color tones of the respective inks in such a manner that the color tones of the images formed with these inks satisfy the relationship (I), may be mentioned selection of dyes, and adjustment of mixing proportions of the pigment and dye.

For selecting a preferable dye, may be mentioned, for example, the following method.

First, a 100% solid image is printed on an OHP film for ink-jet printing with an ink alone containing only carbon black as a coloring material, and the CIELAB color space of the image formed with the ink containing only the pigment is measured to determine the a* and b* values of the image. Separately from this, a 100% solid image is printed on the same recording medium as described above with an ink alone containing only a dye as a coloring material, and the CIELAB color space of the image formed with the ink containing only the dye is measured. This measurement is conducted as to various dyes to determine the CIELAB color space values of 100% solid printed images formed with the respective dye inks, and the a* and b* values are plotted on an a*–b* plane. The concentrations of dyes and pigments, at which printing is conducted for the measurement, are preferably near the concentrations of dyes and pigments actually used in recording. The a* and b* values in a mixed system of a dye and a pigment may be roughly estimated by the vectorial sum of the a* and b* values for the respective coloring materials. Therefore, the optimum dye system can be screened from such a plot. However, such a method is an aim. In fact, it is preferred that components be finely adjusted while measuring the color tone of an image formed on a recording medium.

The mixing proportions of the dye and pigment contained in inks are preferably adjusted in such a manner that the a* and b values of an image formed with each of the inks used in the formation of a black image satisfy the relationship (I), and an image having a satisfactory optical density is provided even when the image is formed on a transparent recording medium. For example, when carbon black is used as a pigment, and such a dye as described below is used as a dye, the weight ratio of the carbon black to the dye is preferably from 10:1 to 1:5, more preferably from 5:1 to 1:5.

Incidentally, since the problem of the so-called undertone of carbon black becomes more serious in an ink lower in concentration of coloring material as an ink, it is preferred that the amount of a dye mixed for toning be increased in such a case.

Water-soluble dyes specifically usable may be suitably selected for use from among conventionally-known water-soluble dyes. For example, water-soluble acid dyes, direct dyes, reactive dyes and the like described in COLOR INDEX may be used. Even dyes not described in COLOR INDEX may also be used without any particular limitation so far as inks capable of forming an image satisfying the relationship (I) can be prepared therefrom. Water-soluble dyes preferably used in the present invention include, for example, water-soluble dyes having at least one COOH or COSH group, with the water-soluble dyes having at least one COOH group being particularly preferred.

Water-soluble dyes, which can be used in combination with carbon black with good results, will hereinafter be described in detail.

For example, dyes represented by the following structural formulae (a) to (e) are mentioned. Specifically, the following Illustrative Compounds 1 to 31 are preferably used in the present invention. The preferable form of each of the dyes represented by the structural formulae (a) to (e) and the Illustrative Compounds 1 to 31 in an ink is such that at least one of COOH and COSH groups is converted into an ammonium salt. However, the counter ion is not limited to an ammonium ion, and any of those heretofore known as counter ions to anionic dyes, such as sodium and lithium ions, may be used.

(a)

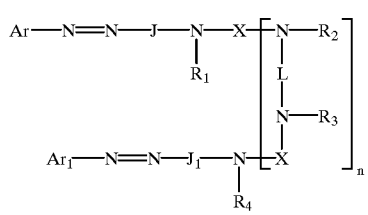

wherein Ar and $Ar_1$ are independently an aryl or substituted aryl group, at least one of Ar and $Ar_1$ has at least one substituent group selected from COOH and COSH, n is 0 or 1, J and $J_1$ are independently a bonding group selected from groups represented by the general formulae (1) to (3);

(1)

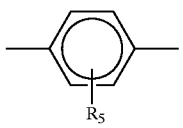

(2)

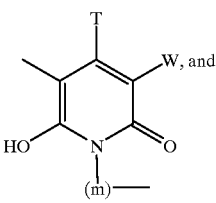

(3)

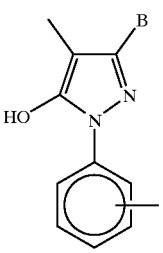

in which $R_5$ is selected from the group consisting of hydrogen, alkyl groups, substituted alkyl groups, alkoxy groups, halogens, CN, a ureido group and $NHCOR_6$ ($R_6$ being hydrogen, or an alkyl, substituted alkyl, aryl, substituted aryl, aralkyl or substituted aralkyl group), T is an alkyl group, W is selected from the group consisting of hydrogen, CN, $CONR_{10}R_{11}$ ($R_{10}$ and $R_{11}$ being independently hydrogen, or an alkyl or substituted alkyl group), pyridinium and COOH groups, m is an alkylene chain having 2 to 8 carbon atoms, and B is hydrogen, or an alkyl or COOH groups, $R_1$, $R_2$, $R_3$ and $R_4$ are independently hydrogen, or an alkyl or substituted alkyl group, L is a divalent bonding group, X is a carbonyl group or a bonding group selected from groups represented by the general formulae (4) to (6);

(4)

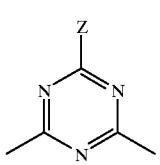

(5)

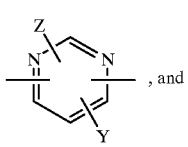

, and (6)

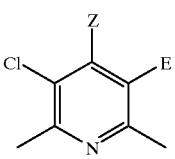

in which Z is $OR_7$, $SR_7$ or $NR_8R_9$ ($R_7$, $R_8$ and $R_9$ being independently hydrogen, or an alkenyl, substituted alkenyl, alkyl, substituted alkyl, aryl, substituted aryl, aralkyl or substituted aralkyl group, or $R_8$ and $R_9$ may forming a 5- or 6-membered ring together with the nitrogen atom to which they are bonded), Y is hydrogen, chlorine, CN or Z, and E is chlorine or CN, with the proviso that when a compound of the formula (a) has no $SO_3H$ group (in this specification, the $SO_3H$ group means a free sulfonic group or a salt with an optional base throughout the specification and claims), the compound has at least two groups selected from COOH and COSH, or when a compound of the formula (a) has one or more $SO_3H$ groups, the compound has groups selected from COOH and COSH of at least the same number as the number of $SO_3H$ groups.

Preferred compounds of the compounds represented by the structural formula (a) are such that Ar and $Ar_1$ are independently an aryl or substituted aryl group having at least one carboxyl group as a substituent group, J and $J_1$ are independently a group represented by the formula (1) or (2), and X is a bonding group represented by the formula (4) or (5).

Specific examples of more preferable compounds represented by the structural formula (a) are mentioned below.

Illustrative Compound 1:

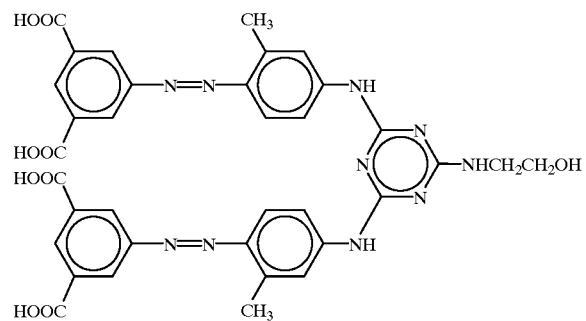

Illustrative Compound 2:

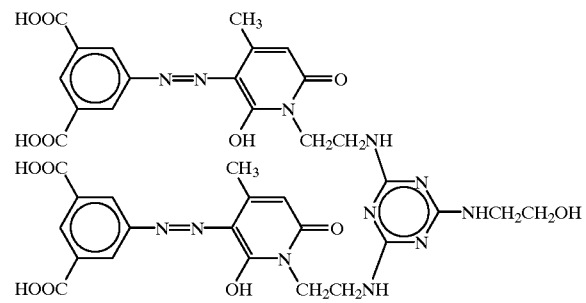

Illustrative Compound 3:

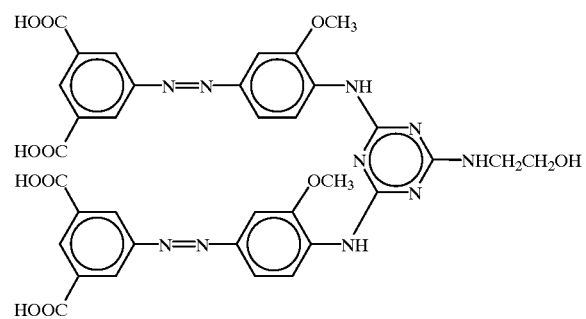

Illustrative Compound 4:

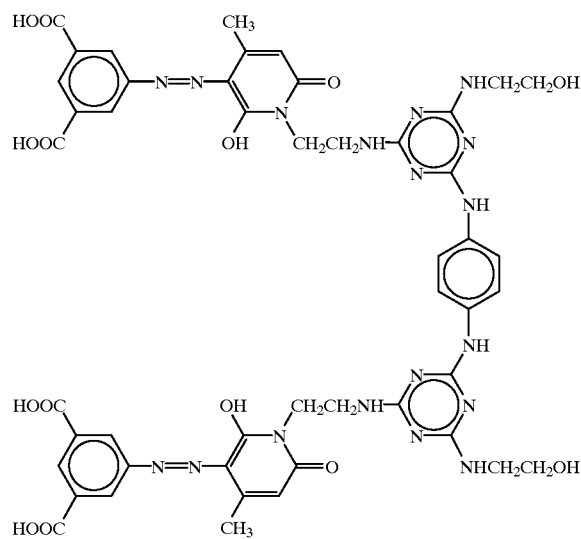

Illustrative Compound 5:

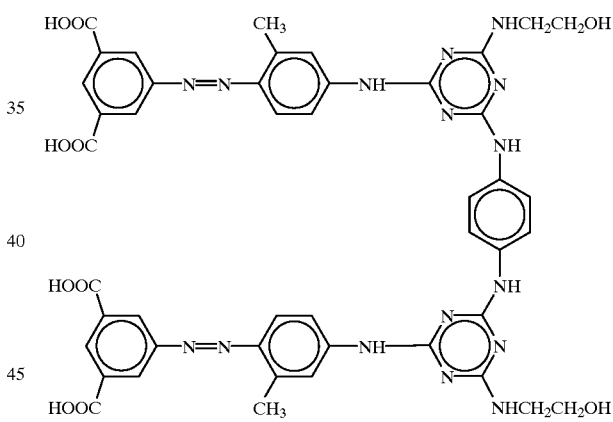

Illustrative Compound 6:

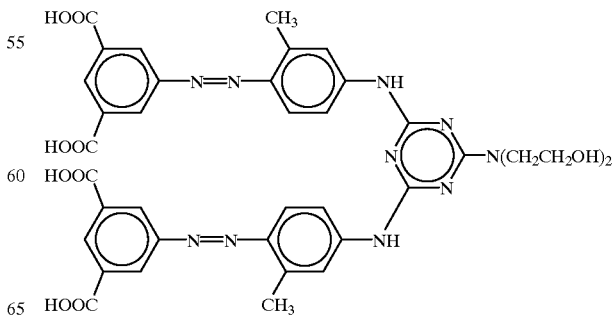

Illustrative Compound 7:

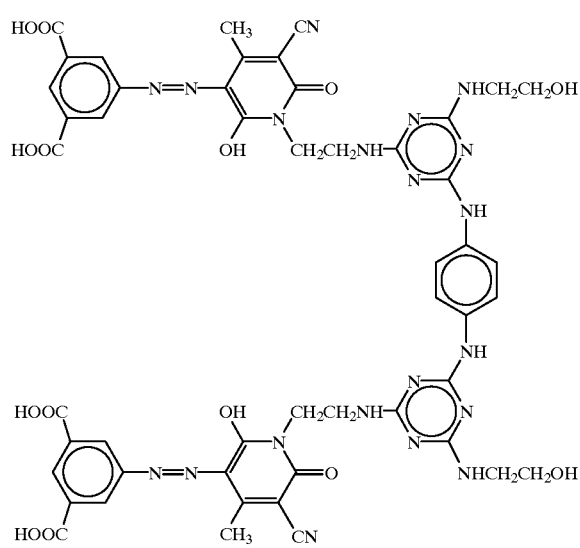

Illustrative Compound 8:

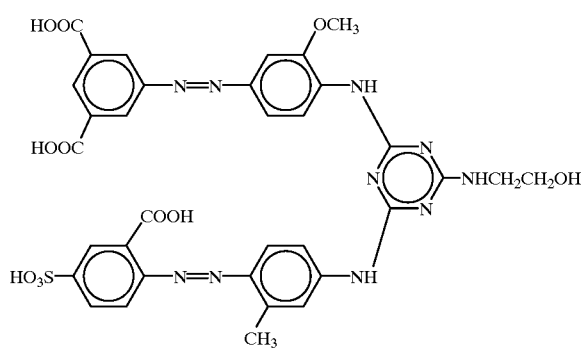

Illustrative Compound 9:

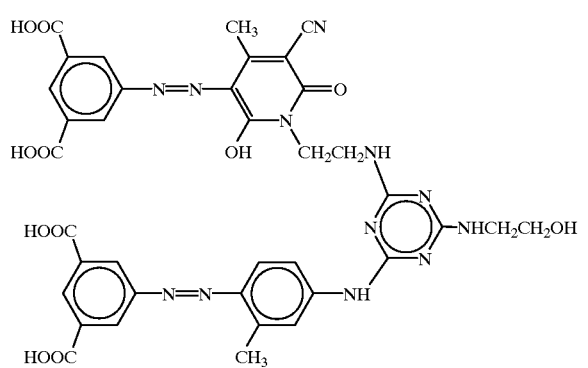

Illustrative Compound 10:

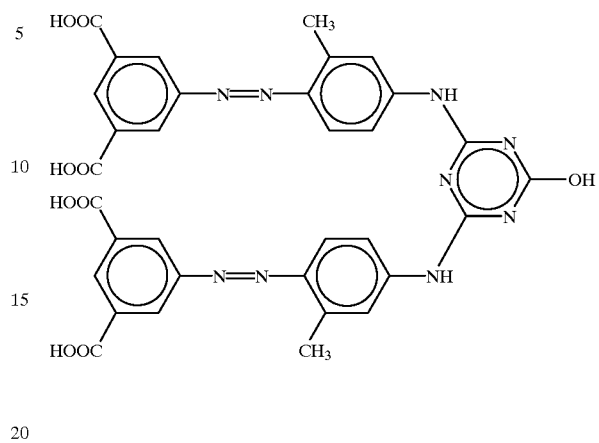

Illustrative Compound 11:

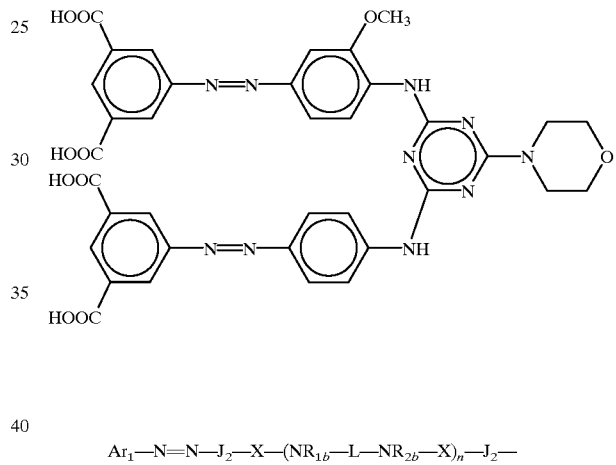

$$Ar_1-N=N-J_2-X-(NR_{1b}-L-NR_{2b}-X)_n-J_2-N=N-Ar_2 \quad (b)$$

wherein $J_2$ represents a formula (7);

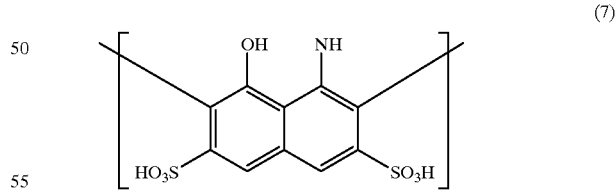

(7)

$Ar_1$ and $Ar_2$ are independently an aryl or substituted aryl group, at least one of $Ar_1$ and $Ar_2$ has at least one substituent group selected from COOH and COSH, $R_{1b}$ and $R_{2b}$ are independently hydrogen, or an alkyl, substituted alkyl, alkenyl or substituted alkenyl group, L is a divalent bonding group, n is 0 or 1, and X is a carbonyl group or a bonding group selected from groups represented by the general formulae (8) to (10);

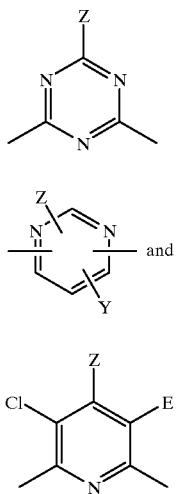

in which Z is OR_7, SR_7 or NR_8R_9 (R_7, R_8 and R_9 being independently hydrogen, or an alkyl, substituted alkyl, alkenyl, substituted alkenyl, aryl, substituted aryl, aralkyl or substituted aralkyl group, or R_8 and Rg may forming a 5- or 6-membered ring together with the nitrogen atom to which they are bonded), Y is hydrogen, chlorine or Z, and E is chlorine or CN, with the proviso that a compound represented by the formula (b) has groups selected from COOH and COSH of at least the same number as the number of SO_3H groups.

Preferred compounds of the compounds represented by the structural formula (b) are such that $Ar_1$ and $Ar_2$ are independently an aryl or substituted aryl group having at least one carboxyl group as a substituent, and X is a carbonyl group or a group represented by the formula (8) or (9).

Specific examples of more preferable compounds represented by the structural formula (b) are mentioned below.

Illustrative Compound 12:

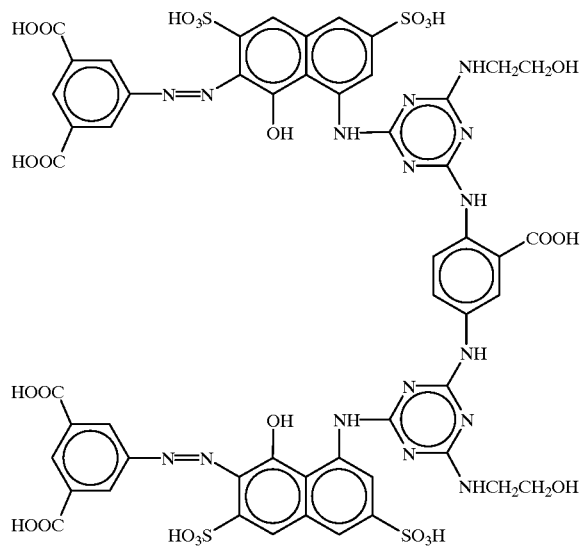

Illustrative Compound 13:

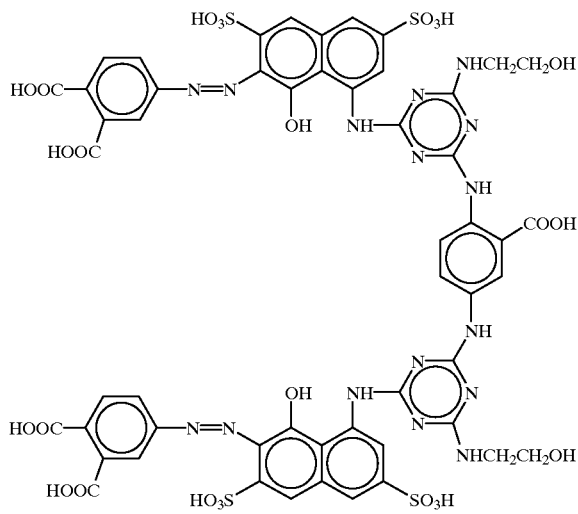

Illustrative Compound 14:

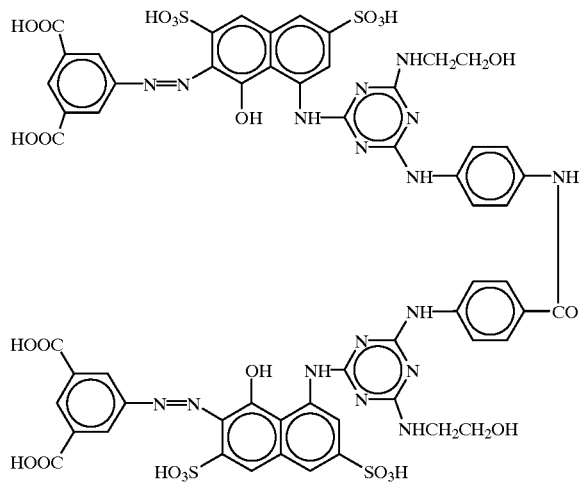

Illustrative Compound 15:

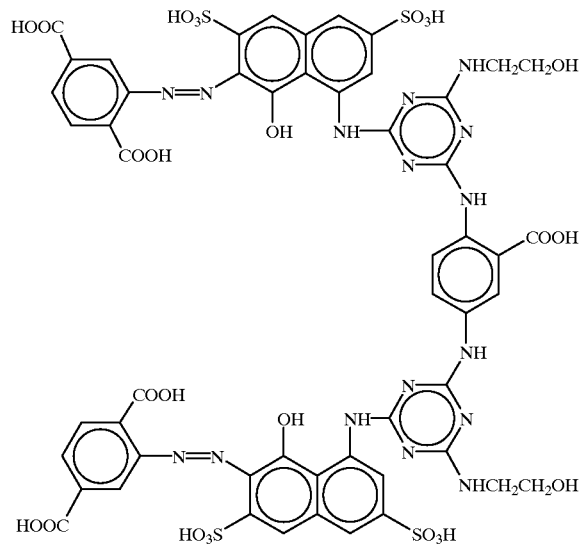

Illustrative Compound 16:

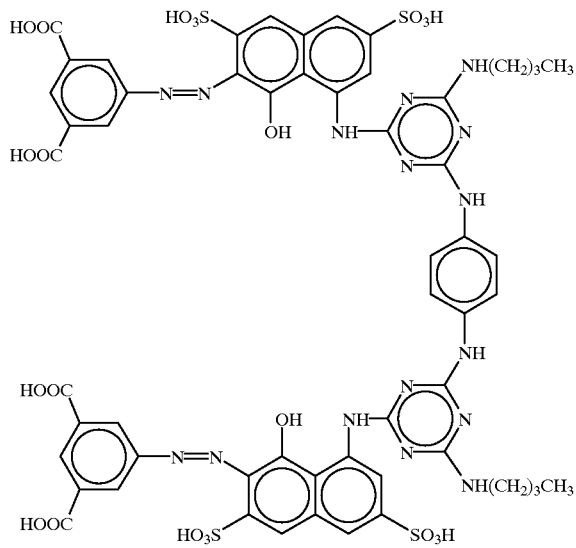

Illustrative compound 17:

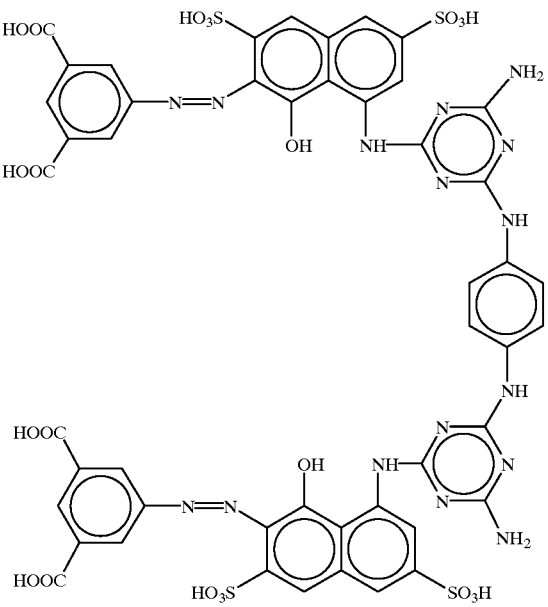

Illustrative Compound 18:

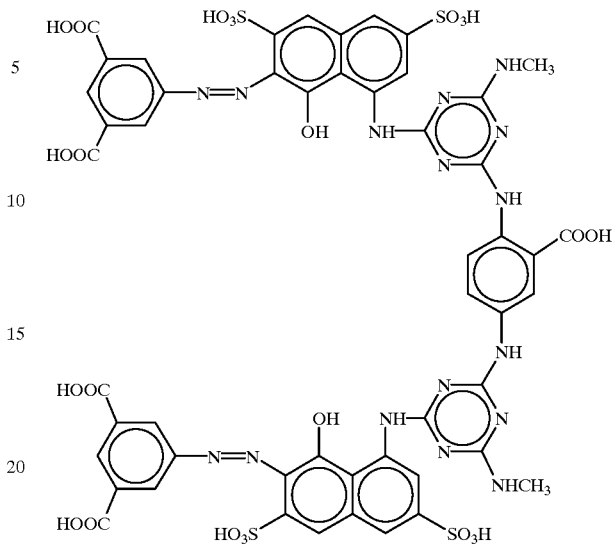

Illustrative Compound 19:

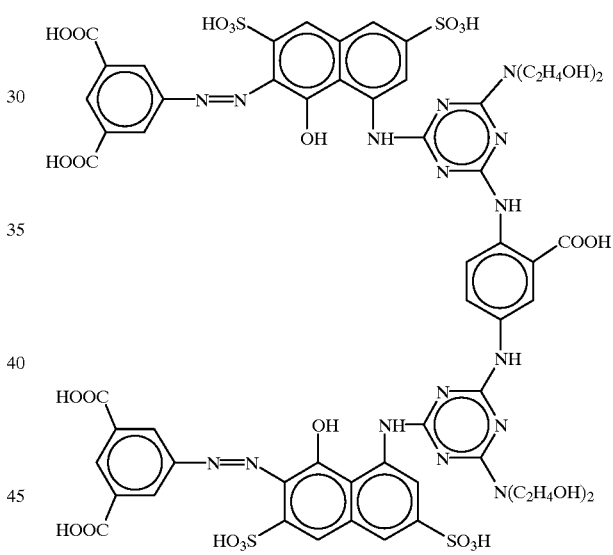

$$Pc(SO_3H)_t(SO_2-NR_{1c}-L-NR_{2c}-X-NR_{3c}-G)_q \qquad (c)$$

wherein Pc is a phthalocyanine nucleus, $R_{1c}$, $R_{2c}$ and $R_{3c}$ are independently hydrogen, or an alkyl, substituted alkyl, alkenyl, substituted alkenyl, aralkyl or substituted aralkyl group, L is a divalent bonding group, X is a carbonyl group or a bonding group selected from groups represented by the general formulae (11) to (13);

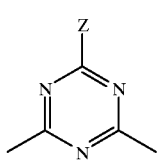

(11)

-continued

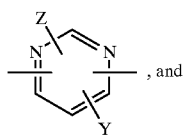
(12)

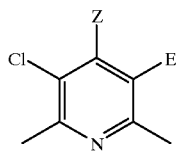
(13)

in which Z is $OR_{12}$, $SR_{12}$ or $NR_{13}R_{14}$ ($R_{12}$, $R_{13}$ and $R_{14}$ being independently hydrogen, or an alkyl, substituted alkyl, aryl, substituted aryl, aralkyl or substituted aralkyl group, or $R_{13}$ and $R_{14}$ may forming a 5- or 6-membered ring together with the nitrogen atom to which they are bonded), Y is hydrogen, chlorine or Z, and E is chlorine or CN, G is a colorless organic group substituted by 1 or 2 groups selected from COSH and COOH, and (t+q) is 3 or 4, with the proviso that a compound represented by the formula (c) has at least one $SO_3H$ group and groups selected from COSH and COOH of the same number as the number of $SO_3H$ groups.

Preferred compounds of the compounds represented by the structural formula (c) are such that X is a carbonyl group or a bonding group represented by the formula (11) or (12), and G is an organic acid group having at least one carboxyl group.

Specific examples of more preferable compounds represented by the structural formula (c) are mentioned below.

Illustrative Compound 20:

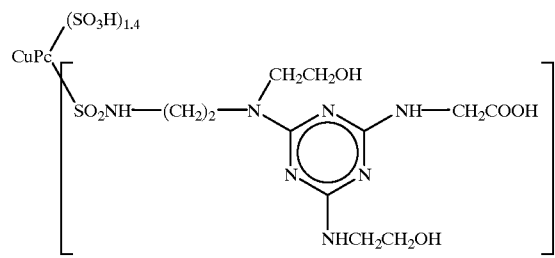

Illustrative Compound 21:

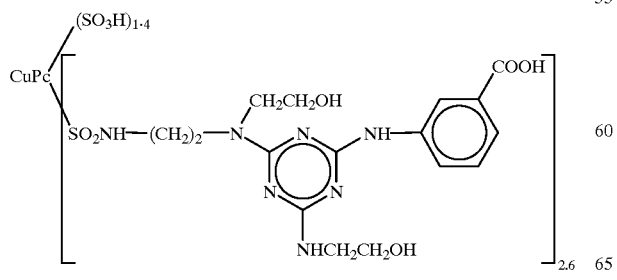

Illustrative Compound 22:

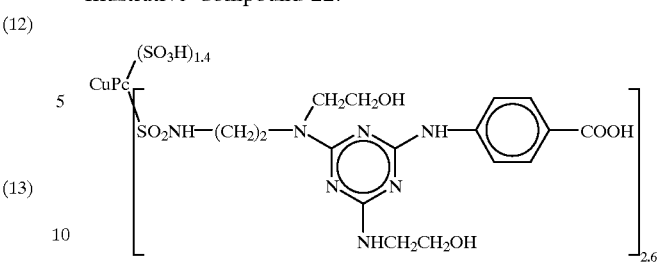

Illustrative Compound 23:

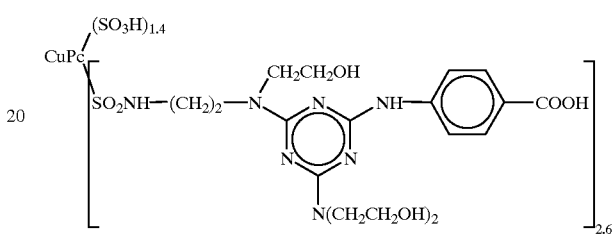

Illustrative Compound 24:

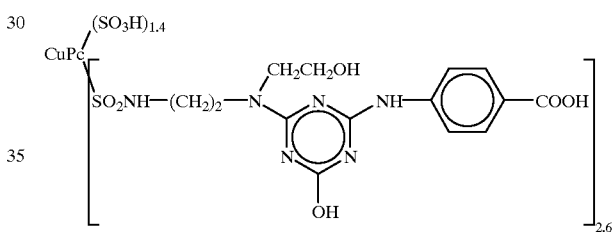

Illustrative Compound 25:

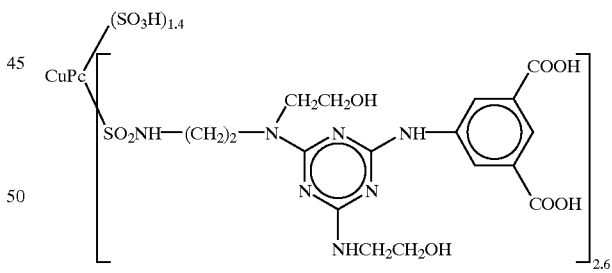

Illustrative Compound 26:

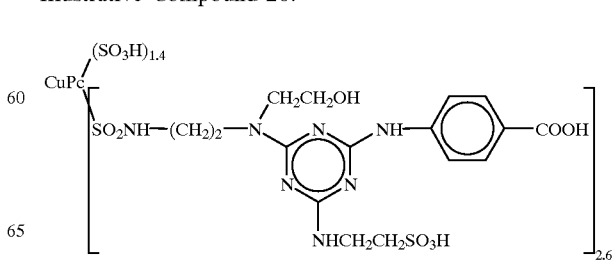

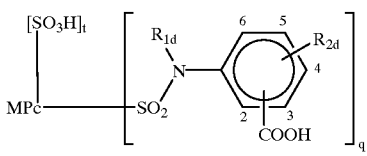
(d)

wherein M is a metal cation or hydrogen, Pc is a trivalent or tetravalent phthalocyanine group, $R_{1d}$ is hydrogen, or an alkyl, substituted alkyl, alkenyl, substituted alkenyl, aralkyl or substituted aralkyl group, $R_{2d}$ is hydrogen, an alkyl group, halogen, an alkoxy group or an amino group which may be substituted, and (t+q) is 3 or 4, with the proviso that COOH is bonded to a 2, 3, 5 or 6 position in the formula (d).

Specific examples of more preferable compounds represented by the structural formula (d) are mentioned below.

Illustrative Compound 27:

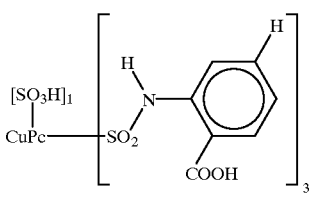

Illustrative Compound 28:

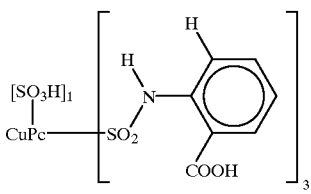

Illustrative Compound 29:

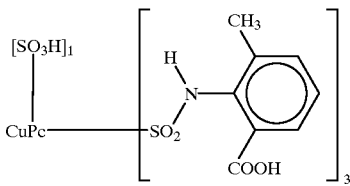

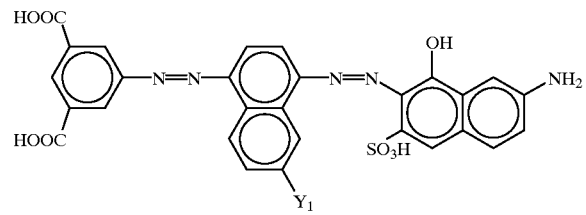
(e)

wherein Y1 is hydrogen or $SO_3H$.

Specific examples of more preferable compounds represented by the structural formula (e) are mentioned below.

Illustrative Compound 30:

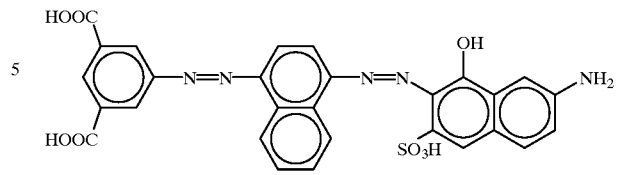

Illustrative Compound 31:

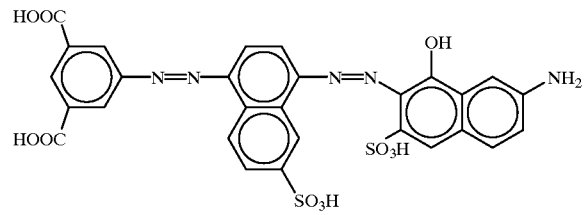

The content of the above-mentioned pigment and dye in the ink, which are used as a coloring material making up each ink used in the ink-jet recording method according to the present invention, is preferably within a range of from 0.1 to 20% by weight, more preferably from 0.1 to 5% by weight based on the total weight of the ink.

In the ink-jet recording method according to the present invention, no particular limitation is imposed on other components in the black inks different from each other in concentration of coloring material so far as the inks contain the pigment and water-soluble dye as a coloring material, the a* and b* values of an image formed with each of the inks satisfy the relationship (I), and the inks have good ink-jet ejection property. Other components making up each black ink used in the present invention will hereinafter be described.

As an aqueous medium dispersing the pigment and dissolving the dye therein, a mixed solvent of water and a water-soluble organic solvent is preferably used. The content of the water-soluble organic solvent in the ink is preferably within a range from 2 to 60% by weight, more preferably from 5 to 25% by weight based on the total weight of the ink.

As examples of the water-soluble organic solvent preferably used in the present invention, may be mentioned alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; alkyl ethers of polyhydric alcohols, such as ethylene glycol methyl ether, ethylene glycol ethyl ether, triethylene glycol monomethyl ether and triethylene glycol monoethyl ether; 1,2,6-hexanetriol; N-methyl-2-pyrrolidone; 2-pyrrolidone; and 1,3-dimethyl-2-imidazolidinone. However, the water-soluble organic solvents are not limited thereto.

To the black inks used in the present invention, may be added a surfactant, antifoaming agent, pH adjustor, antiseptic and/or the like in addition to the pigment and dye as a coloring material, the aqueous medium dispersing or dissolving the coloring material therein and the above-described dispersing agent optionally used for dispersing the pigment for the purpose of adjusting various properties of the inks. In the present invention, it is preferred to use inks composed of these materials and having a surface tension within a range preferably from 15 to 60 dyn/cm, more preferably from 20 to 50 dyn/cm.

No particular limitation is imposed on recording media used in the ink-jet recording method, and plain paper such as paper for copying and bond paper, coated paper specially prepared for ink-jet recording, glossy paper, films for OHP, etc. may be preferably used.

Of these, when an image with a plurality of tones is formed particularly on a recording medium of the structure that an ink-receiving layer is provided on a transparent base material, the image is observed through transmitted light. Therefore, high hiding power (high optical density of image) is required even at a highlight portion thereof. When a pigment ink is used for meeting such a requirement, the undertone of the pigment becomes conspicuous, so that the tone property of the image may be impaired in some cases. According to the present invention, however, both optical density of image and tone property can be satisfied. In addition, when a recording medium, in which a hot melt layer is provided on the ink-receiving layer of such a transparent recording medium as described above to more protect an image formed thereon by heating the medium after printing to melt the hot melt layer, is used, the water resistance, rub-off resistance and the like of the image formed thereon can be improved. It is hence more preferred to use such a recording medium.

Figure 2:
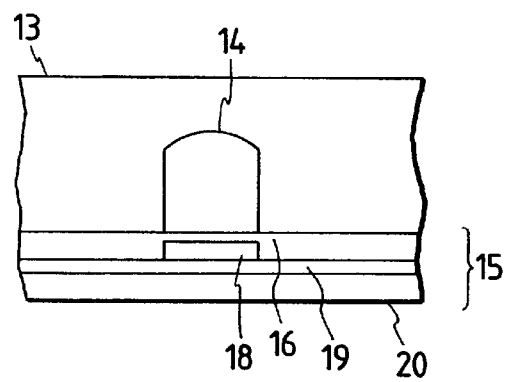
FIG. 2 is a transverse cross-sectional view of the head of the ink-jet recording apparatus.
Figure 3:
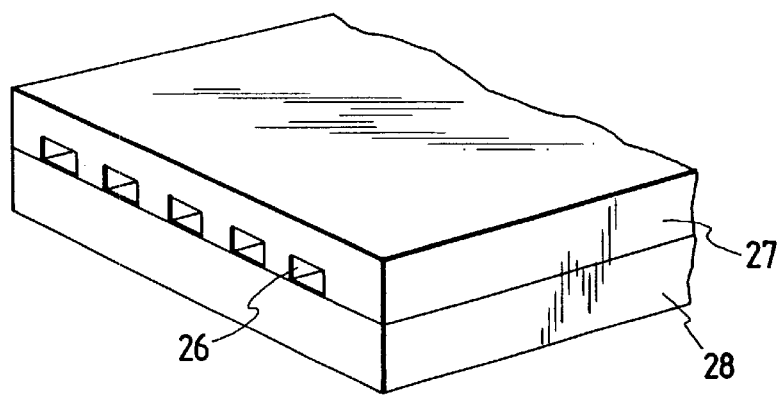
FIG. 3 is a schematic perspective view of a multi-head which is an array of such heads as shown in FIG. 1.

As an ink-jet system and apparatus suitable for implementing the present invention, may be mentioned a method and apparatus in which thermal energy corresponding to recording signals is applied to an ink within a recording head to eject droplets of the ink by the thermal energy. Examples of the construction of the head, which is a main part of such an apparatus, are illustrated in FIGS. 1, 2 and 3.

A head 13 is formed by bonding a glass, ceramic or plastic plate or the like having a groove 14 through which an ink is passed to a heating head 15 which is used for thermal recording (the drawings show a thin layer head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure not illustrated.

Now, upon application of electric signal information to the electrodes 17-1 and 17-2, the heating head 15 rapidly generates heat at the region shown by n to form bubbles in the ink 21 which is in contact with this region. The meniscus 23 of the ink is projected by the pressure thus produced, and the ink 21 is ejected from the ejection orifice 22 to a recording medium 25 in the form of ink droplets 24.

FIG. 3 illustrates an appearance of a multi-head composed of an array of a number of heads shown in FIG. 1. The multi-head is formed by closely bonding a glass plate 27 having a number of grooves 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
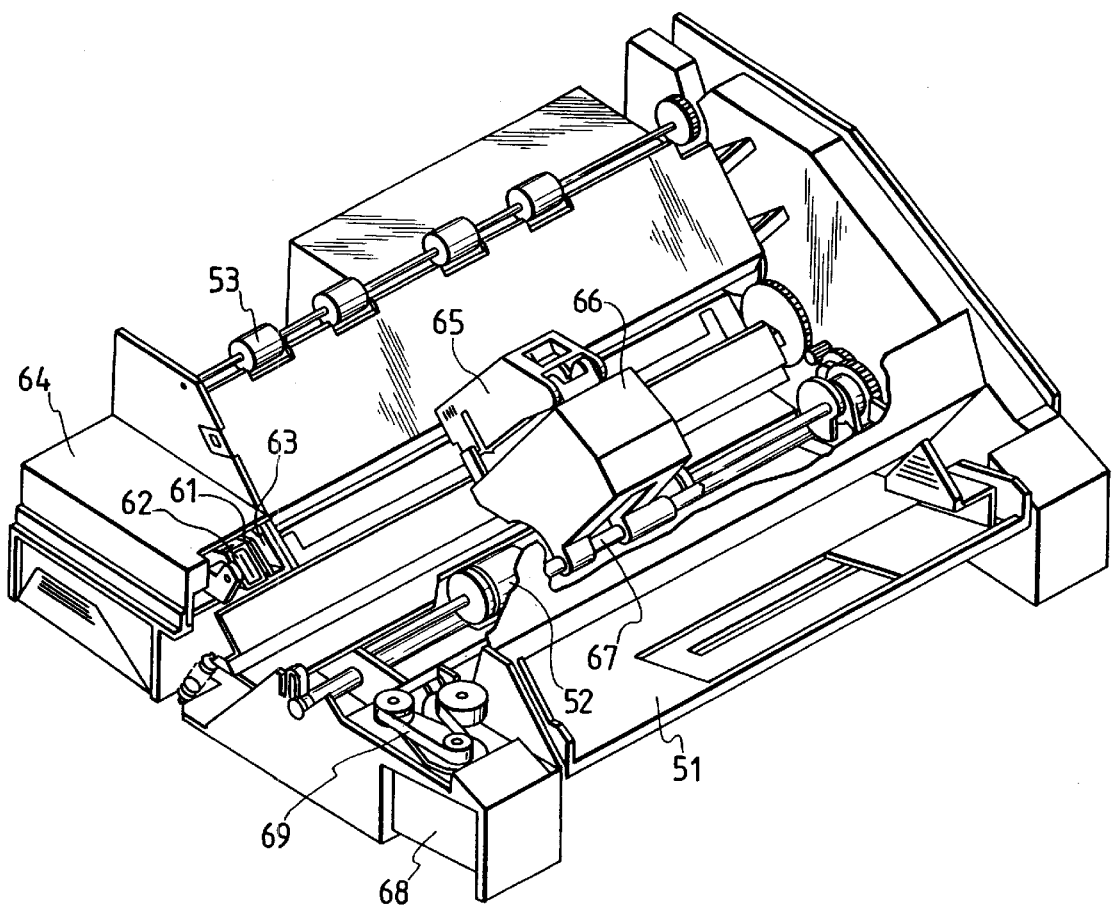
FIG. 4 is a schematic perspective view illustrating an exemplary ink-jet recording apparatus.

FIG. 4 illustrates an example of an ink-jet recording apparatus in which the above head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved.

Reference numeral 62 indicates a cap for a face of ejection openings of the recording head 65, which is provided at a home position adjacent to the blade 61, and is constructed so that it moves in a direction perpendicular to a direction in which the recording head 65 is moved, and comes into contact with the face of ejection openings to cap it. Reference numeral 63 denotes an ink-absorbing member provided adjoiningly to the blade 61 and, similar to the blade 61, held in such a form that it protrudes into the course through which the recording head 65 is moved.

The above-described blade 61, cap 62 and ink-absorbing member 63 constitute an ejection-recovery portion 64, where the blade 61 and ink-absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved.

The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged to a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as those for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
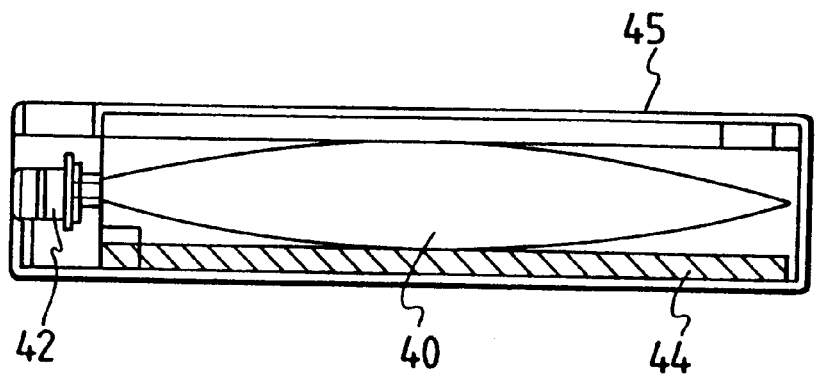
FIG. 5 is a longitudinal cross-sectional view of an ink cartridge.

FIG. 5 illustrates an exemplary ink cartridge 45 in which an ink to be fed to the head through an ink-feeding member, for example, a tube is contained.

Here, reference numeral 40 designates an ink container portion containing the ink to be fed, as exemplified by a ink bag. One end thereof is provided with a stopper 42 made of rubber. A needle (not illustrated) may be inserted into this stopper 42 so that the ink in the ink bag 40 can be fed to the head. Reference numeral 44 indicates an ink-absorbing member for receiving a waste ink.

It is preferred that the ink container portion be formed of a polyolefin, in particular, polyethylene, at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
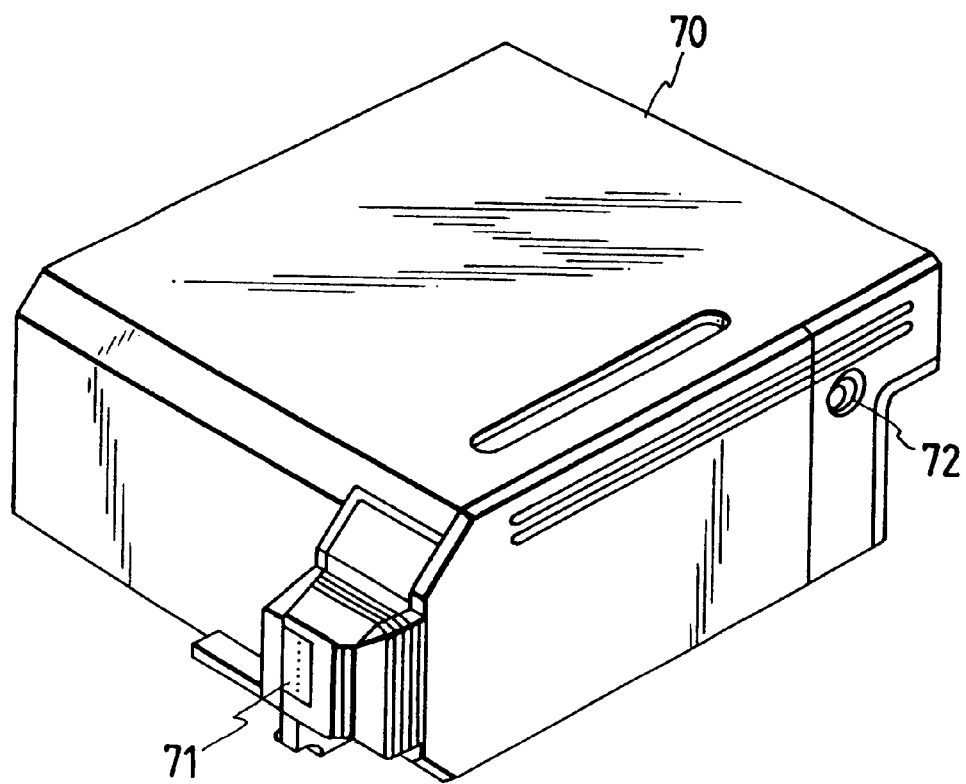
FIG. 6 is a schematic perspective view illustrating an exemplary printing unit.

In FIG. 6, reference numeral 70 designates a recording unit, in the interior of which an ink container portion containing an ink, for example, an ink-absorbing member, is contained. The recording unit 70 is constructed so that the ink in such an ink-absorbing member is ejected in the form of ink droplets through a head 71 having a plurality of orifices.

In the present invention, polyurethane, cellulose or polyvinyl acetate is preferably used as a material for the ink-absorbing member. Reference numeral 72 indicates an air passage for connecting the interior of the recording unit 70 with the atmosphere. This recording unit 70 can be used in place of the recording head 65 shown in FIG. 4, and is easily attached on or detached from the carriage 66.

The present invention will hereinafter be described more specifically by the following Examples and Comparative Example. However, the present invention is not limited to these examples.

EXAMPLE 1

Their corresponding components shown in the following Table 1 were blended to prepare 4 black inks (Inks 1-A, 1-B, 1-C and 1-D) which were used in Example 1 and different from one another in concentration of coloring material.

TABLE 1

Compositions of inks used in Example 1
(unit: part by weight)

| Component | 1-A | 1-B | 1-C | 1-D |
|---|---|---|---|---|
| CABOJET 200 (product of CABOT Co.) | 4 | 2 | 1 | 0.5 |
| C.I. Food Black 2 | 0.5 | 1.0 | 0.8 | 0.6 |
| C.I. Direct Blue 199 | 0.2 | 0.5 | 0.4 | 0.3 |
| Glycerol | 10 | 10 | 10 | 10 |
| Ethylene glycol | 10 | 10 | 10 | 10 |
| Water | Bal | Bal | Bal | Bal |
| Carbon black: water-soluble dye | 5.7:1 | 1.3:1 | 1:1.2 | 1:1.8 |

*: The inks were prepared in such a manner that ink components amounted to 100 parts by weight in total (the same shall apply to the following Examples and Comparative Example).

[Evaluation]

(1) The inks shown in Table 1 were charged into tanks for black ink, yellow ink, magenta ink and cyan ink in an ink-jet printer (BJC600J, trade name; manufactured by Canon Inc.) in order of concentration of coloring material, beginning with the thickest, thereby applying the inks to a sheet for OHP (transparent film for OHP; CF-301, trade name, product of Canon Inc.) to form 4 (four) of 100% solid printed images composed of the respective inks. The CIELAB color space of each image was measured with single pass to determine the a* and b* values thereof. The a* and b* values are determined in accordance with the following equations (II) and (III), respectively.

$$a^* = 500[(X/X_n)^{1/3} - (Y/Y_n)^{1/3}](X/X_n) \quad (II)$$

$$b^* = 200[(Y/Y_n)^{1/3} - (Z/Z_n)^{1/3}](Z/Z_n) \quad (III)$$

wherein X, Y and Z are tristimulus values in an XYZ colorimetric system, and $X_n$, $Y_n$ and $Z_n$ are tristimulus values on a perfect diffuse reflectance plane.

Figure 7:
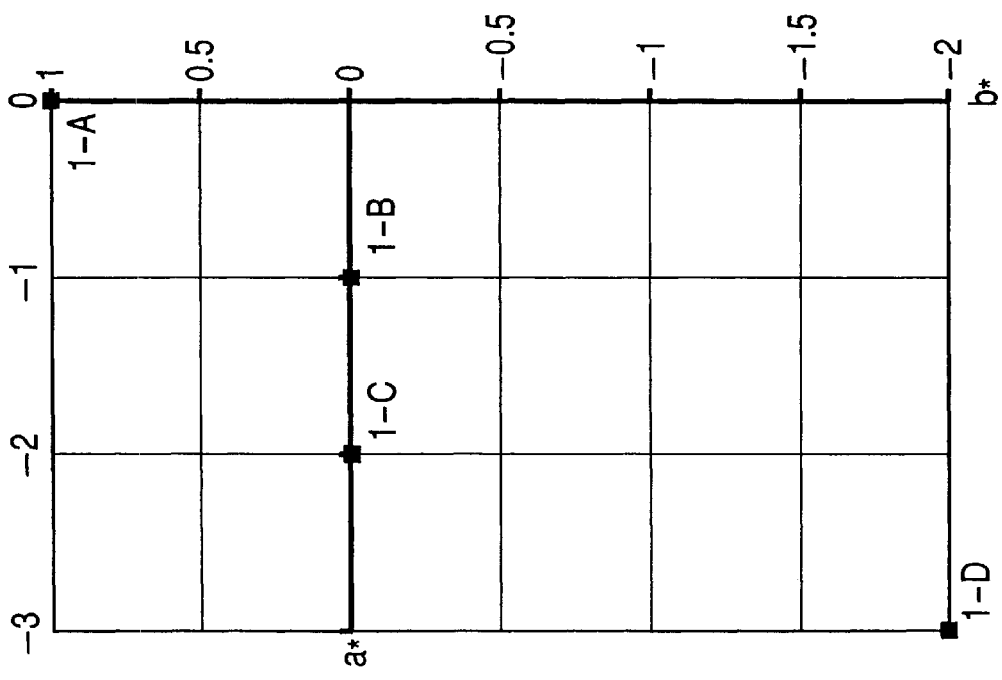
FIG. 7 is a CIE La*b* color space chromaticity diagram showing hues of respective inks used in Example 1.

FIG. 7 illustrates the $(a^{*2}+b^{*2})^{1/2}$ values of the 100% solid printed images formed on the OHP sheet with the respective inks (1-A, 1-B, 1-C and 1-D) plotted on an a*–b* plane. As apparent from this drawing, all the inks according to Example 1 satisfied the conditions of $(a^{*2}+b^{*2})^{1/2} \leq 15$.

(2) The tone representation (in particular, color tone) of the images formed on the OHP sheet in (1) was visually observed.

(3) The printer provided in (1) was used to conduct overlap printing with the inks with 100% duty on a sheet for OHP (transparent film for OHP; CF-301, trade name, product of Canon Inc.) newly provided. The transmission density of the thus-obtained image was measured at a portion of the maximum shot-in ink quantity by means of a Macbeth reflection densitometer (manufactured by Macbeth Co.) to evaluate the image in accordance with the following standard:

A: optical density of image not lower than 2;
B: optical density of image not lower than 1.5, but lower than 2;
C: optical density of image lower than 1.5.

The results of (2) and (3) are shown in Table 6.

EXAMPLE 2

Their corresponding components shown in the following Table 2 were blended to prepare 4 black inks (Inks 2-A, 2-B, 2-C and 2-D) which were used in Example 2 and different from one another in concentration of coloring material.

TABLE 2

Compositions of inks used in Example 2
(unit: part by weight)

| Component | 2-A | 2-B | 2-C | 2-D |
|---|---|---|---|---|
| CABOJET 200 (product of CABOT Co.) | 4 | 2 | 1 | 0.5 |
| C.I. Direct Black 195 | 0.5 | 0.5 | 0.3 | 0.25 |
| C.I. Direct Blue 199 | 0.3 | 0.4 | 0.2 | 0.25 |
| Glycerol | 10 | 10 | 10 | 10 |
| Ethylene glycol | 10 | 10 | 10 | 10 |
| Water | Bal | Bal | Bal | Bal |
| Carbon black: water-soluble dye | 5:1 | 2.22:1 | 2:1 | 1:1 |

[Evaluation]

Figure 8:
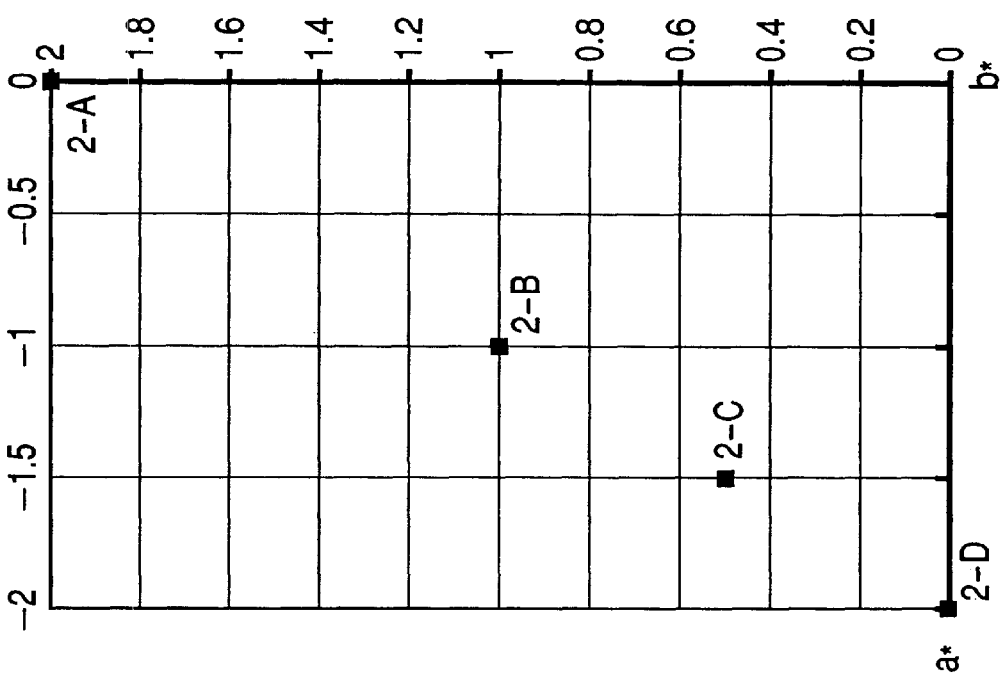
FIG. 8 is a CIE La*b* color space chromaticity diagram showing hues of respective inks used in Example 2.

(1) The CIELAB color space of each of 100% solid printed images respectively formed on the OHP sheet with the inks (2-A, 2-B, 2-C and 2-D) in the same manner as in Example 1 was measured to determine the a* and b* values thereof in the same manner as in Example 1. FIG. 8 illustrates the $(a^{*2}+b^{*2})^{1/2}$ values of the 100% solid printed images formed on the OHP sheet plotted on an a*–b* plane. As apparent from this drawing, all the inks according to Example 2 satisfied the conditions of $(a^{*2}+b^2)^{1/2} \leq 15$.

(2) The tone representation (in particular, color tone) of the images formed on the OHP sheet in (1) was visually observed.

(3) The transmission density of an image formed in accordance with the same method as the method described in Evaluation (3) of Example 1 was measured to evaluate the image likewise.

The results of (2) and (3) are shown in Table 6.

EXAMPLE 3

Their corresponding components shown in the following Table 3 were blended to prepare 4 black inks (Inks 3-A, 3-B, 3-C and 3-D) which were used in Example 3 and different from one another in concentration of coloring material.

TABLE 3

Compositions of inks used in Example 3 (unit: part by weight)

| Component | 3-A | 3-B | 3-C | 3-D |
|---|---|---|---|---|
| CABOJET 300 (product of CABOT Co.) | 4 | 2 | 1 | 0.5 |
| C.I. Direct Black 168 | 1 | 0.8 | 0.8 | 0.8 |
| Illustrative compound 20 | 0.3 | 0.4 | 0.5 | 0.5 |
| Glycerol | 10 | 10 | 10 | 10 |
| Ethylene glycol | 10 | 10 | 10 | 10 |
| Water | Bal | Bal | Bal | Bal |
| Carbon black: water-soluble dye | 3.08:1 | 1.67:1 | 1:1.3 | 1:2.6 |

[Evaluation]

Figure 9:
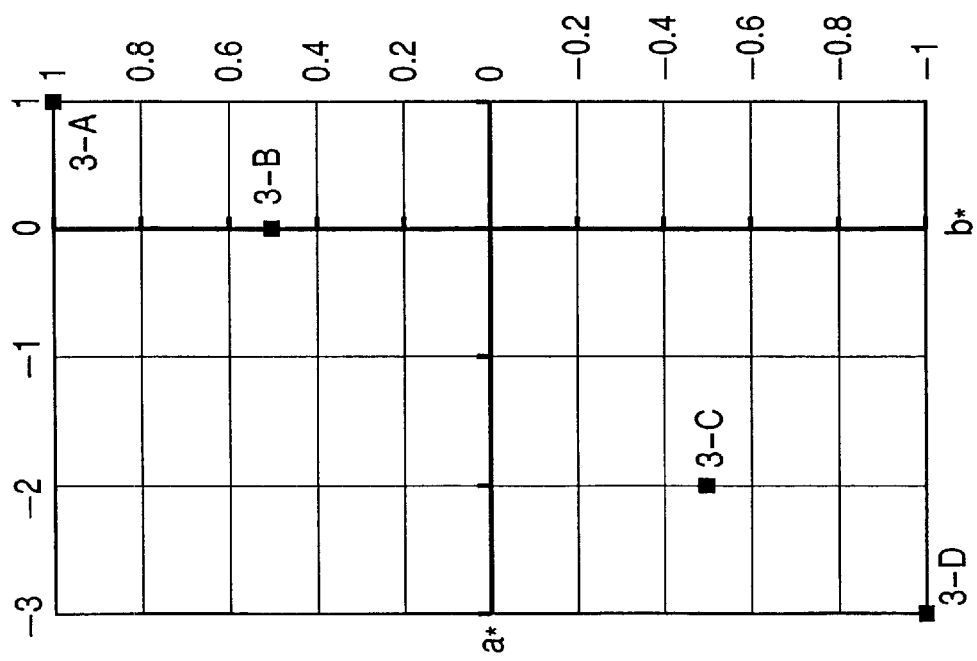
FIG. 9 is a CIE La*b* color space chromaticity diagram showing hues of respective inks used in Example 3.

(1) The CIELAB color space of each of 100% solid printed images respectively formed on the OHP sheet with the inks (3-A, 3-B, 3-C and 3-D) in the same manner as in Example 1 was measured to determine the a* and b* values thereof in the same manner as in Example 1. FIG. 9 illustrates the $(a^{*2}+b^{*2})^{1/2}$ values of the 100% solid printed images formed on the OHP sheet plotted on an a*–b* plane. As apparent from this drawing, all the inks according to Example 3 satisfied the conditions of $(a^{*2}+b^{*}2)^{1/2} \leq 15$.

(2) The tone representation (in particular, color tone) of the images formed on the OHP sheet in (1) was visually observed.

(3) The transmission density of an image formed in accordance with the same method as the method described in Evaluation (3) of Example 1 was measured to evaluate the image likewise.

The results of (2) and (3) are shown in Table 6.

EXAMPLE 4

Their corresponding components shown in the following Table 4 were blended to prepare 4 black inks (Inks 3-A, 3-B, 3-C and 3-D) which were used in Example 4 and different from one another in concentration of coloring material.

TABLE 4

Compositions of inks used in Example 3 (unit: part by weight)

| Component | 4-A | 4-B | 4-C | 4-D |
|---|---|---|---|---|
| CABOJET 300 (product of CABOT Co.) | 4 | 2 | 1 | 0.5 |
| C.I. Direct Black 195 | 1.5 | 1.0 | 0.8 | 0.4 |
| Illustrative compound 20 | 0.75 | 0.6 | 0.4 | 0.2 |

TABLE 4-continued

Compositions of inks used in Example 3 (unit: part by weight)

| Component | 4-A | 4-B | 4-C | 4-D |
|---|---|---|---|---|
| Glycerol | 10 | 10 | 10 | 10 |
| Ethylene glycol | 10 | 10 | 10 | 10 |
| Water | Bal | Bal | Bal | Bal |
| Carbon black: water-soluble dye | 1.78:1 | 1.25:1 | 1:1.2 | 1:1.2 |

[Evaluation]

Figure 10:
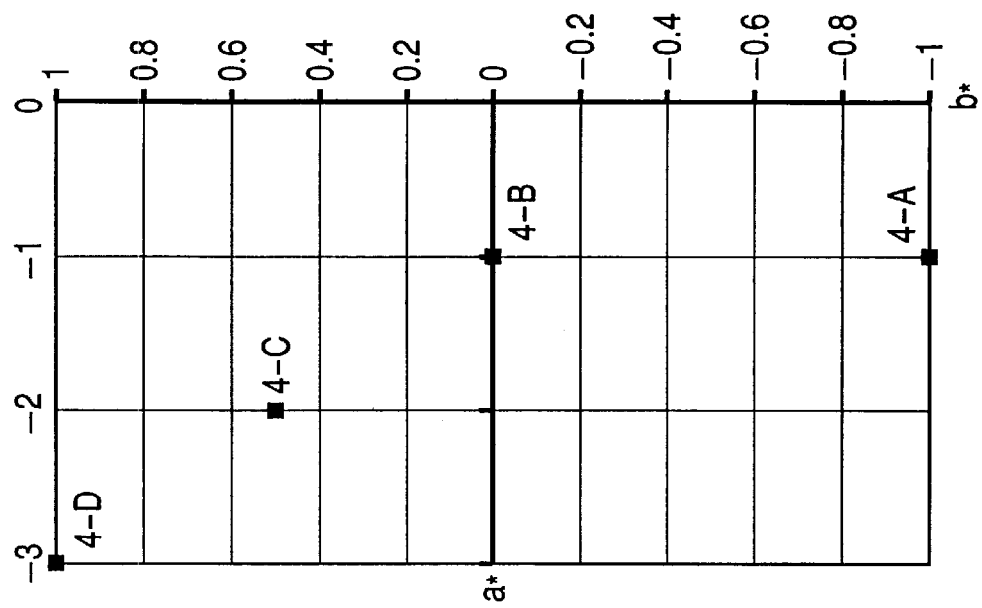
FIG. 10 is a CIE La*b* color space chromaticity diagram showing hues of respective inks used in Example 4.

(1) The CIELAB color space of each of 100% solid printed images respectively formed on the OHP sheet with the inks (4-A, 4-B, 4-C and 4-D) in the same manner as in Example 1 was measured to determine the a* and b* values thereof in the same manner as in Example 1. FIG. 10 illustrates the $(a^{*2}+b^{*2})^{1/2}$ values of the 100% solid printed images formed on the OHP sheet plotted on an a*–b* plane. As apparent from this drawing, all the inks according to Example 4 satisfied the conditions of $(a^{*2}+b^{*2})^{1/2} \leq 15$.

(2) The tone representation (in particular, color tone) of the images formed on the OHP sheet in (1) was visually observed.

(3) The transmission density of an image formed in accordance with the same method as the method described in Evaluation (3) of Example 1 was measured to evaluate the image likewise.

The results of (2) and (3) are shown in Table 6.

COMPARATIVE EXAMPLE 1

Four black inks (Inks 5-A, 5-B, 5-C and 5-D) which were used in Comparative Example 1 and different from one another in concentration of coloring material were prepared in accordance with the same composition as in Example 1 except that carbon black alone was used as a coloring material without using any water-soluble dye as shown in the following Table 5.

TABLE 5

Compositions of inks used in Comparative Example 1 (unit: part by weight)

| Component | 5-A | 5-B | 5-C | 5-D |
|---|---|---|---|---|
| CABOJET 200 (product of CABOT Co.) | 4 | 2 | 1 | 0.5 |
| Glycerol | 10 | 10 | 10 | 10 |
| Ethylene glycol | 10 | 10 | 10 | 10 |
| Water | Bal | Bal | Bal | Bal |

[Evaluation]

(1) The CIELAB color space of each of 100% solid printed images respectively formed on the OHP sheet with the inks (5-A, 5-B, 5-C and 5-D) in the same manner as in Example 1 was measured to determine the a* and b* values thereof in the same manner as in Example 1. FIG. 11 illustrates the $(a^{*2}+b^{*2})^{1/2}$ values of the 100% solid printed images formed on the OHP sheet plotted on an a*–b* plane. As apparent from this drawing, the inks according to Comparative Example 1 did not satisfy the conditions of $(a^{*2}+b^{*2})^{1/2} \leq 15$.

(2) The tone representation (in particular, color tone) of the images formed on the OHP sheet in (1) was visually observed.

(3) The transmission density of an image formed in accordance with the same method as the method described in Evaluation (3) of Example 1 was measured to evaluate the image likewise.

The results of (2) and (3) are shown in Table 6.

The transmission densities of the images formed with the respective ink sets of Examples 1 to 4 and Comparative Example 1 were high because the inks containing a pigment were used. The respective four kinds of inks used in Examples 1 to 4 having their corresponding compositions shown in Tables 1 to 4 each permitted the formation of an image satisfying the relationship of $(a^{*2}+b^{*2})^{1/2} \leq 15$ on the OHP sheet. In addition, the black image with a plurality of tones formed with the four inks prepared in each Example had fine tones without becoming reddish. On the other hand, the black image with a plurality of tones formed with the four inks different in concentration of coloring material prepared in Comparative Example 1 was poor in tone property compared with the black images obtained in Examples 1 to 4.

TABLE 6

| | Evaluation results | |
|---|---|---|
| | Optical density of image | Color tone (tone representation) |
| Example 1 | A | Good |
| Example 2 | A | Good |
| Example 3 | B | Good |
| Example 4 | A | Good |
| Comparative Example 1 | A | Poor |

According to the present invention, as described above, there can be provided an ink-jet recording method by which the problem of color tone at a highlight portion caused in the case where a pigment ink is used to obtain an image having a high optical density by an ink-Jet recording system can be solved, and an ink-jet recording method with which an image having a high optical density, good color tone and fine tone representation can be formed is provided.

What is claimed is:

1. An ink-jet recording method comprising applying a plurality of inks to a recording medium by an ink jet recording system to form a dual or multi-toned image on the recording medium, wherein each of the inks permits formation of such an image on a transparent recording medium whose a* and b* values of CIELAB determined by measuring CIELAB color space of the image on a transparent recording medium with a single pass, satisfy the relationship represented by the following formula (I):

$$(a^{*2}+b^{*2})^{1/2} \leq 15 \qquad (I).$$

2. The ink-jet recording method according to claim 1, wherein at least one of the inks contains a pigment and a water-soluble dye.

3. The ink-jet recording method according to claim 2, wherein each of the inks contains a pigment and a water-soluble dye.

4. The ink-jet recording method according to claim 3, wherein the weight ratio of the pigment to the water-soluble dye in the ink is from 10:1 to 1:5.

5. The ink-jet recording method according to claim 4, wherein the weight ratio of the pigment to the water-soluble dye in the ink is from 5:1 to 1:5.

6. The ink-jet recording method according to claim 3, wherein the inks are different from each other in the ratio of the pigment to the water-soluble dye.

7. The ink-jet recording method according to claim 2, wherein the pigment is carbon black, and the water-soluble dye has a carboxyl group as a group for being solubilized in water.

8. The ink-jet recording method according to claim 2, wherein the water-soluble dye is a dye represented by the structural formula (a);

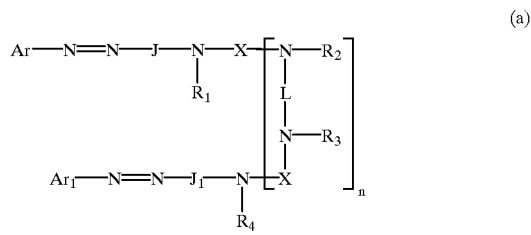

(a)

wherein Ar and $Ar_1$ are independently an aryl or substituted aryl group, at least one of Ar and $Ar_1$ has at least one substituent group selected from COOH and COSH, n is 0 or 1, J and $J_1$ are independently a bonding group selected from the group consisting of the general formulae (1) to (3);

(1)

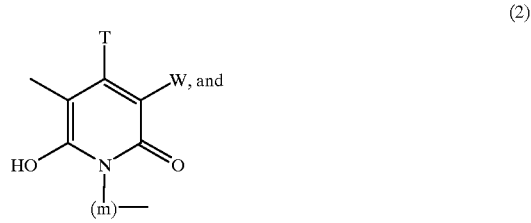

(2)

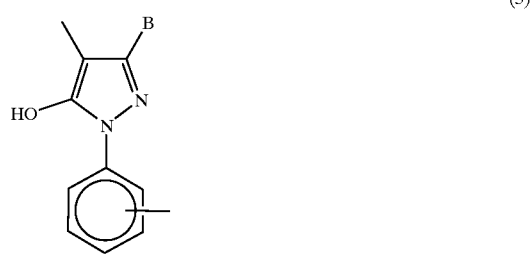

(3)

in which $R_5$ is selected from the group consisting of hydrogen, alkyl groups, substituted alkyl groups, alkoxy groups, halogens, CN, a ureido group and $NHCOR_6$ wherein $R_6$ is hydrogen, or an alkyl, substituted alkyl, aryl, substituted aryl, aralkyl or substituted aralkyl group, T is an alkyl group, W is selected from the group consisting of hydrogen, CN, $CONR_{10}R_{11}$ wherein $R_{10}$ and $R_{11}$ are independently hydrogen, or an alkyl or substituted alkyl group; pyridinium and COOH, m is an alkylene chain having 2 to 8 carbon atoms, and B is hydrogen, or an alkyl or COOH group, $R_1$, $R_2$, $R_3$ and $R_4$ are independently hydrogen, or an alkyl or substituted alkyl group, L is a divalent bonding group, X is a carbonyl group or a bonding group selected from the group consisting of the general formulae (4) to (6);

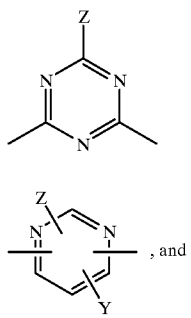

(4)

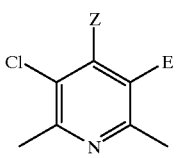

, and (5)

(6)

in which Z is OR$_7$, SR$_7$ or NR$_8$R$_9$ wherein R$_7$, R$_8$ and R$_9$ are independently hydrogen, or an alkenyl, substituted alkenyl, alkyl, substituted alkyl, aryl, substituted aryl, aralkyl or substituted aralkyl group, or R$_8$ and R$_9$ may form a 5- or 6-membered ring together with the nitrogen atom to which they are bonded, Y is hydrogen, chlorine, CN or Z, and E is chlorine or CN, with the proviso that when a compound of the formula (a) has no SO$_3$H group, the compound has at least two groups selected from COOH and COSH, or when a compound of the formula (a) has one or more SO$_3$H groups, the compound has groups selected from COOH and COSH of at least the same number as the number of SO$_3$H groups.

9. The ink-jet recording method according to claim 8, wherein the dye represented by the formula (a) is any one of the following Compounds 1 to 11;

Illustrative Compound 1:

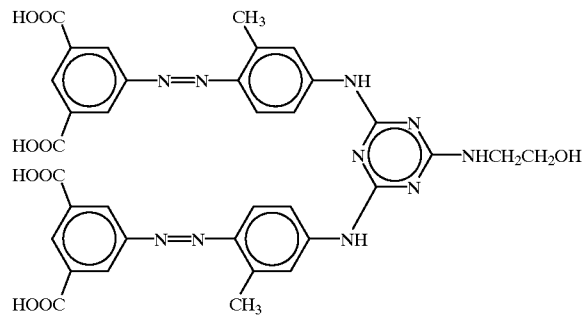

Illustrative Compound 2:

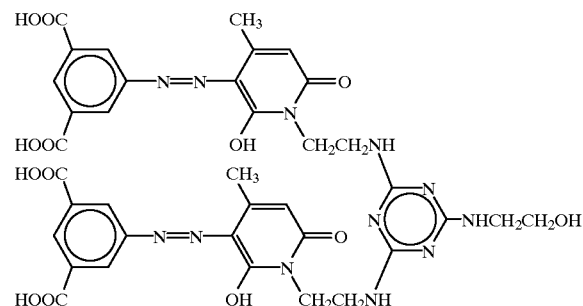

Illustrative Compound 3:

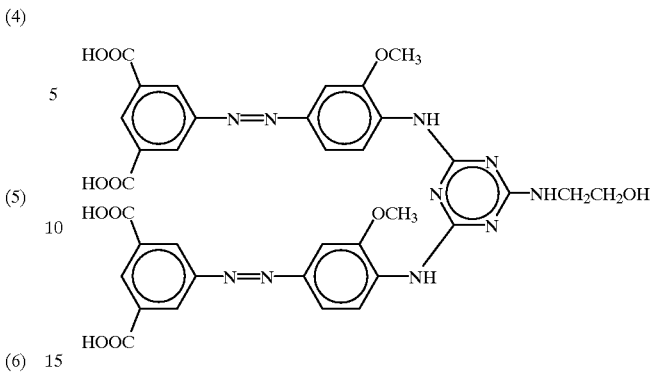

Illustrative Compound 4:

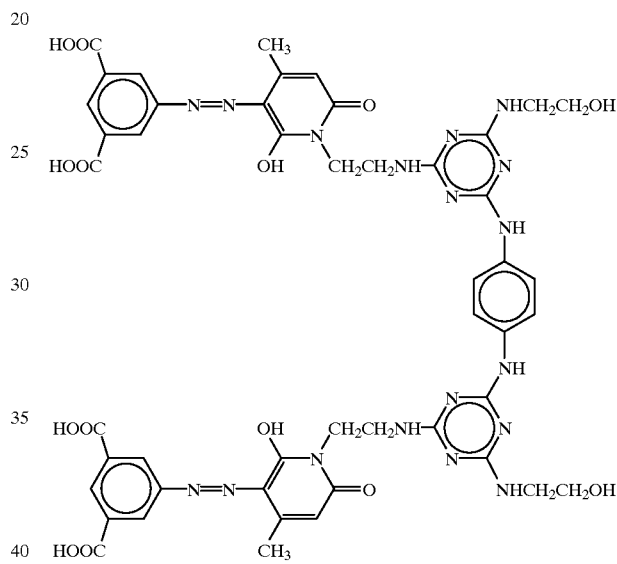

Illustrative Compound 5:

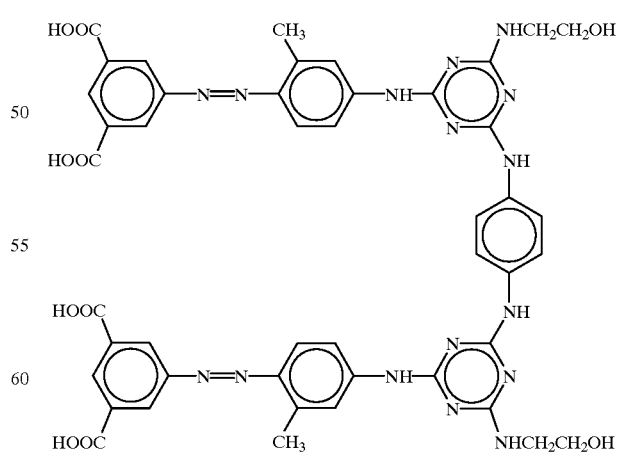

Illustrative Compound 6:

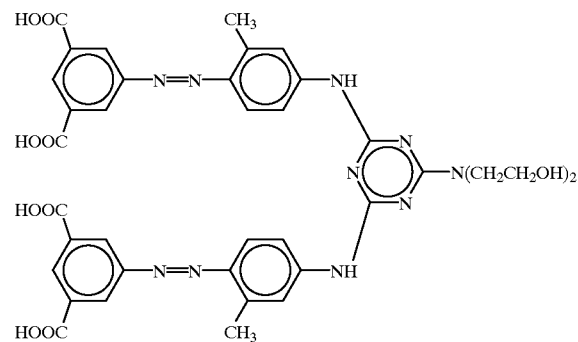

Illustrative Compound 7:

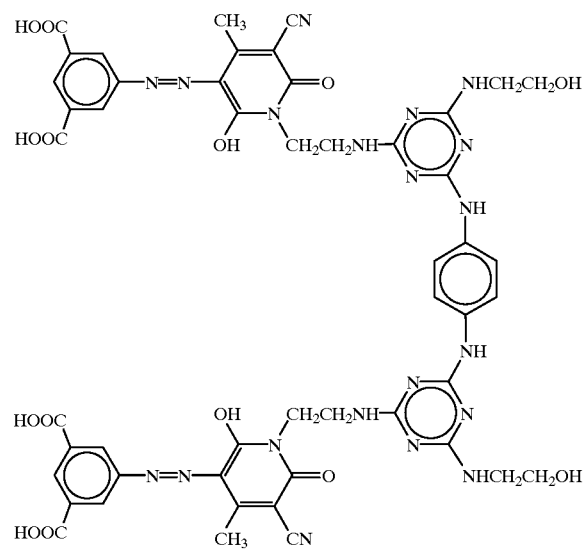

Illustrative Compound 8:

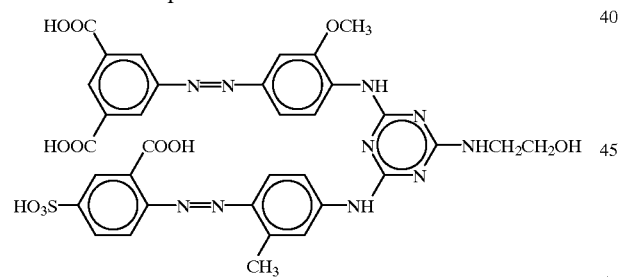

Illustrative Compound 9:

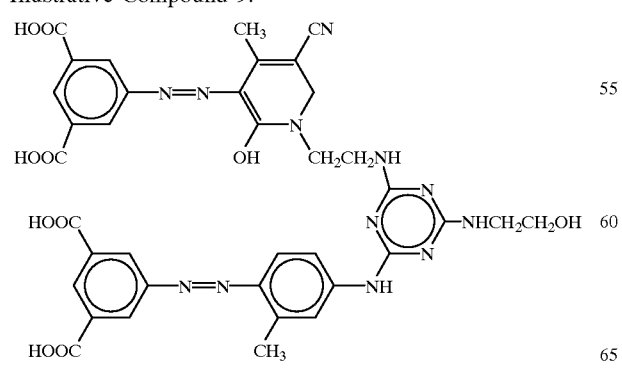

Illustrative Compound 10:

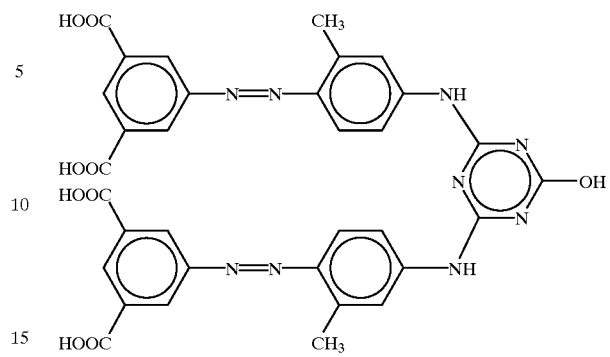

Illustrative Compound 11:

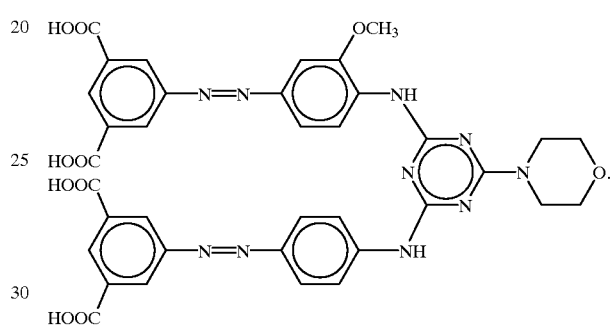

10. The ink-jet recording method according to claim 2, wherein the water-soluble dye is a dye represented by the structural formula (b);

$$Ar_1-N=N-J_2-X-(NR_{1b}-L-NR_{2b}-X)_n-J_2-N=N-Ar_2 \quad \text{(b)}$$

wherein $J_2$ represents a formula (7);

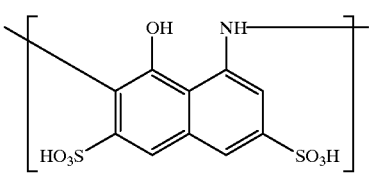

(7)

$Ar_1$ and $Ar_2$ are independently an aryl or substituted aryl group, at least one of $Ar_1$ and $Ar_2$ has at least one substituent group selected from COOH and COSH, $R_{1b}$ and $R_{2b}$ are independently hydrogen, or an alkyl, substituted alkyl, alkenyl or substituted alkenyl group, L is a divalent bonding group, n is 0 or 1, and X is a carbonyl group or a bonding group selected from the group consisting of the general formulae (8) to (10);

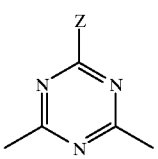

(8)

-continued (9)

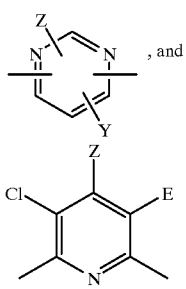

, and (10)

in which Z is $OR_7$, $SR_7$ or $NR_8R_9$ wherein $R_7$, $R_8$ and $R_9$ are independently hydrogen, or an alkyl, substituted alkyl, alkenyl, substituted alkenyl, aryl, substituted aryl, aralkyl or substituted aralkyl group, or $R_8$ and $R_9$ may form a 5- or 6-membered ring together with the nitrogen atom to which they are bonded, Y is hydrogen, chlorine or Z, and E is chlorine or CN, with the proviso that a compound represented by the formula (b) has groups selected from COOH and COSH of at least the same number of $SO_3H$ groups.

11. The ink-jet recording method according to claim 10, wherein the dye represented by the formula (b) is any one of the following Compounds 12 to 19;

Illustrative Compound 12:

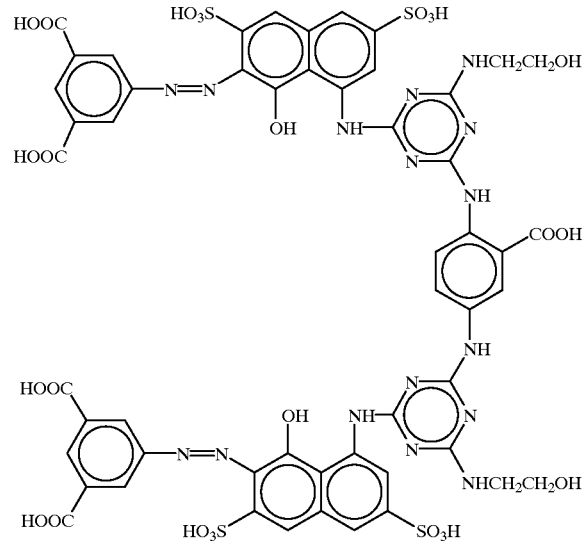

Illustrative Compound 13:

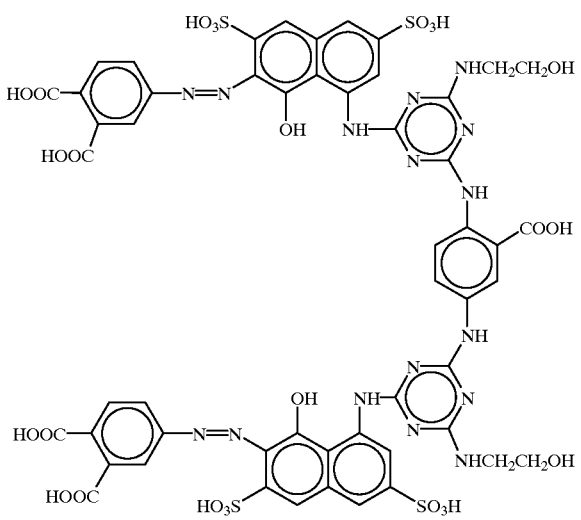

Illustrative Compound 14:

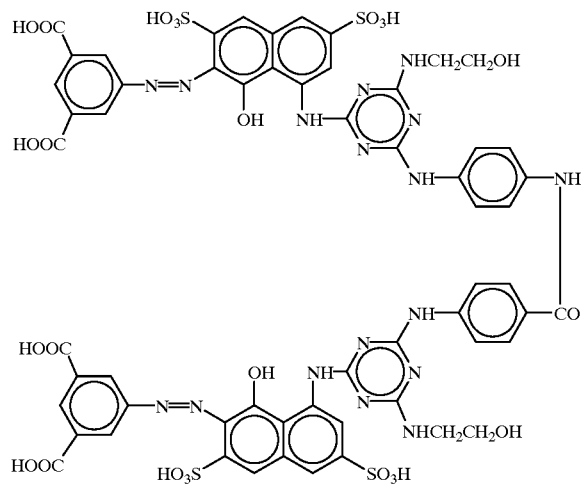

Illustrative Compound 15:

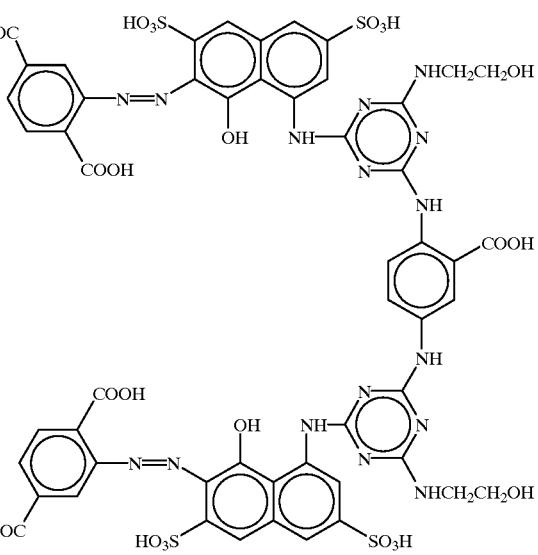

Illustrative Compound 16:

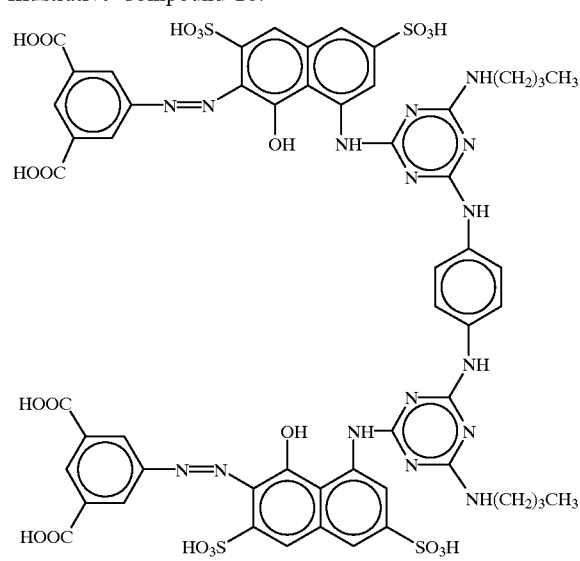

Illustrative Compound 17:

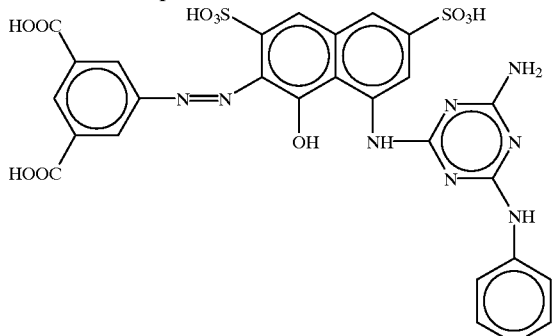

Illustrative Compound 18:

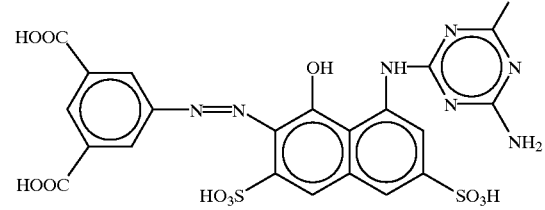

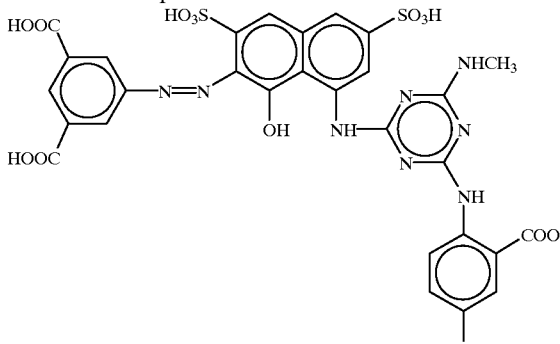

Illustrative Compound 19:

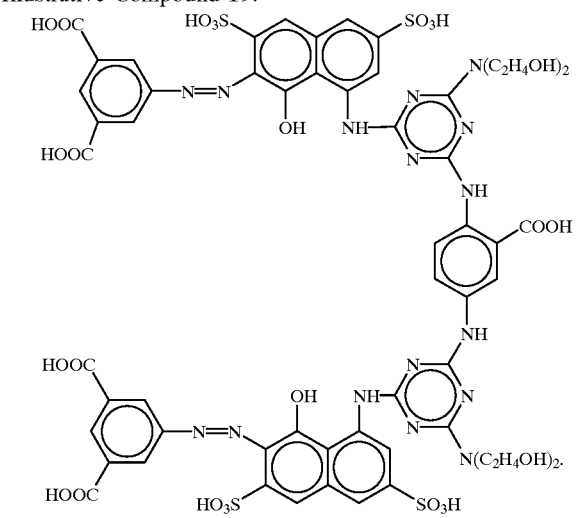

12. The ink-jet recording method according to claim 2, wherein the water-soluble dye is a dye represented by the structural formula (c);

$$Pc\ (SO_3H)_t(SO_2-NR_{1c}-L-NR_{2c}-NR_{3c}-G)_q \qquad (C)$$

wherein Pc is a phthalocyanine nucleus, $R_{1c}$, $R_{2c}$ and $R_{3c}$ are independently hydrogen, or an alkyl, substituted alkyl, alkenyl, substituted alkenyl, aralkyl or substituted aralykyl group, L is a divalent bonding group, X is a carbonyl group or a bonding group selected from the group consisting of the general formulae (11) to (13);

(11)

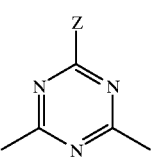

(12)

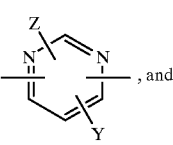
, and (13)

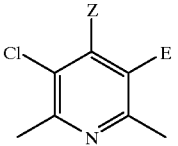

in which Z is $OR_{12}$, $SR_{12}$ or $NR_{13}R_{14}$ wherein $R_{12}$, $R_{13}$ and $R_{14}$ are independently hydrogen, or an alkyl, substituted alkyl, aryl, substituted aryl, aralkyl or substituted aralkyl group, or $R_{13}$ and $R_{14}$ may form a 5- or 6-membered ring together with the nitrogen atom to which they are bonded, Y is hydrogen, chlorine or Z, and E is chlorine or CN, G is a colorless organic group substituted by 1 or 2 groups selected from COSH and COOH, and (t+q) is 3 or 4, with the proviso that a compound represented by the formula (c) has at least one $SO_3H$ group and groups selected from COSH and COOH of the same number as the number of $SO_3H$ groups.

13. The ink-jet recording method according to claim 12, wherein the dye represented by the formula (c) is any one of the following Compounds 20 to 26;

Illustrative Compound 20:

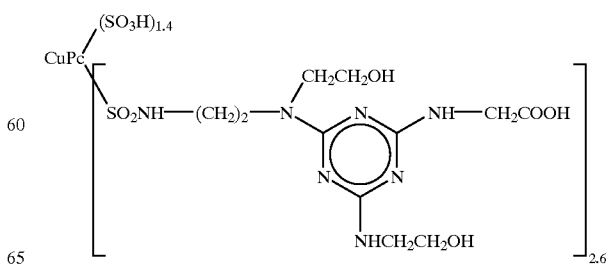

Illustrative Compound 21:

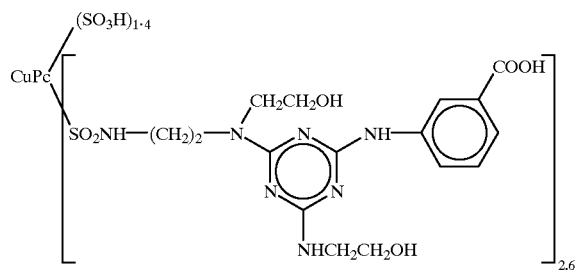

Illustrative Compound 22:

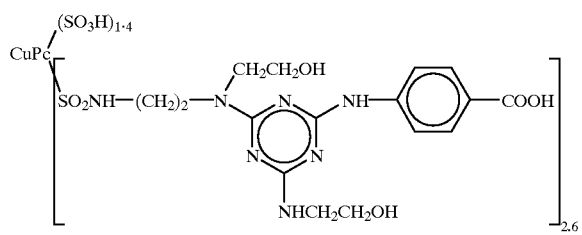

Illustrative Compound 23:

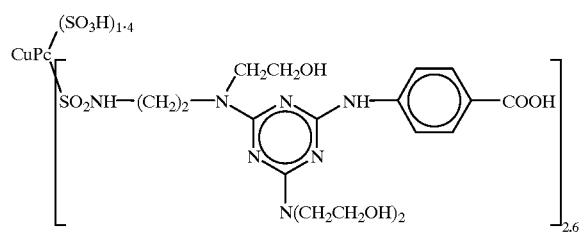

Illustrative Compound 24:

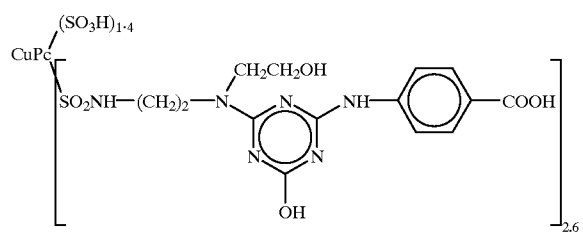

Illustrative Compound 25:

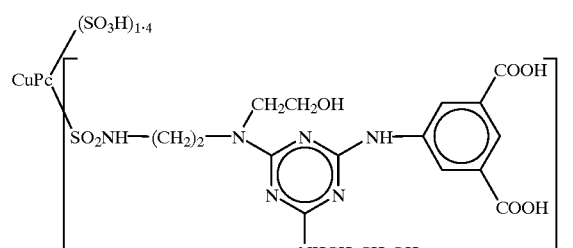

Illustrative Compound 26:

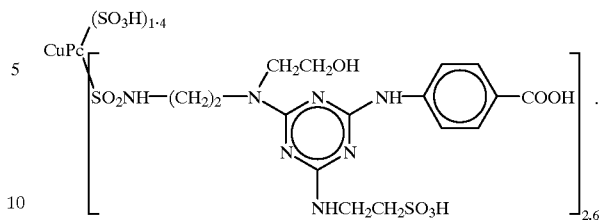

14. The ink-jet recording method according to claim 2, wherein the water-soluble dye is a dye represented by the structural formula (d);

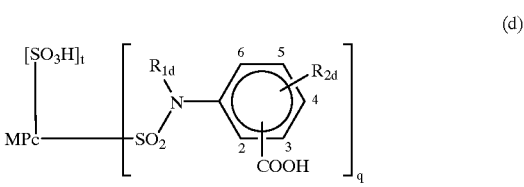

(d)

wherein M is a metal cation or hydrogen, Pc is a trivalent or tetravalent phthalocyanine group, $R_{1d}$ is hydrogen, or an alkyl, substituted alkyl, alkenyl, substituted alkenyl, aralkyl or substituted aralkyl group, $R_{2d}$ is hydrogen, an alkyl group, halogen, an alkoxy group or an amino group which may be substituted, and (t+q) is 3 or 4, with the proviso that COOH is bonded to a 2, 3, 5 or 6 position in the formula (d).

15. The ink-jet recording method according to claim 14, wherein the dye represented by the formula (d) is any one of the following Compounds 27 to 29;

Illustrative Compound 27:

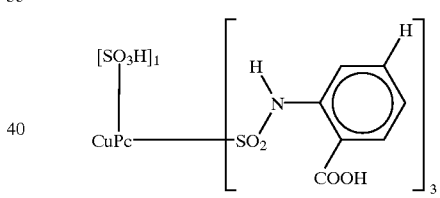

Illustrative Compound 28:

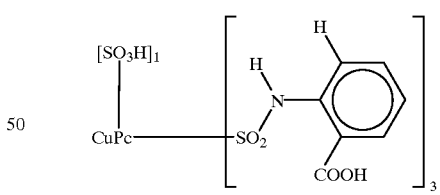

Illustrative Compound 29:

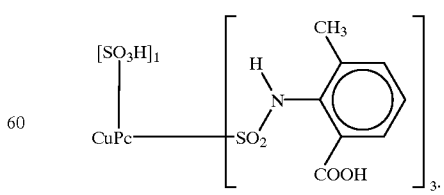

16. The ink-jet recording method according to claim 2, wherein the water-soluble dye is a dye represented by the structural formula (e);

(e)

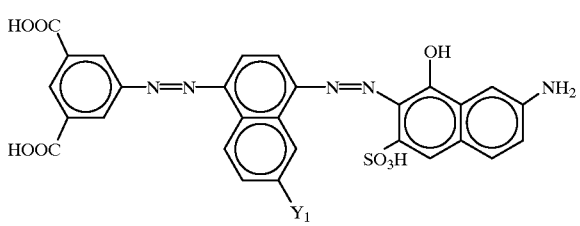

wherein $Y_1$ is hydrogen or $SO_3H$.

17. The ink-jet recording method according to claim 16, wherein the dye represented by the formula (e) is either one of the following Compounds 30 and 31;

Illustrative Compound 30:

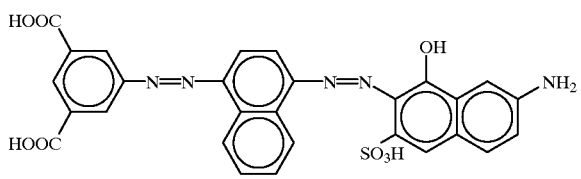

Illustrative Compound 31:

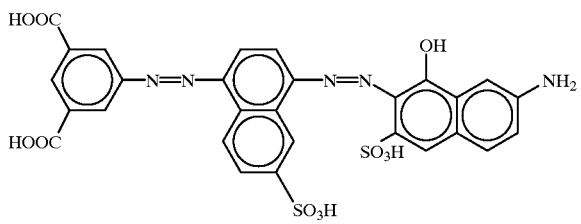

18. The ink-jet recording method according to claim 1, wherein the image with a plurality of tones is a black image.

19. The ink-jet recording method according to claim 1, wherein the recording medium is a transparent recording medium.

20. A process for improving tone property of a dual toned-black image or a multi toned-black image on a transparent recording medium with a plurality of black inks by using an ink-jet recording method,
wherein each of the inks permits formation of such a single toned-black image on a transparent recording medium whose a* and b* values of CIELAB determined by measuring CIELAB color space of the single toned-black images formed with respective inks with a single pass, satisfy the relationship represented by the following formula (I):

$$(a^{*2}+b^{*2})^{1/2} \leq 15 \quad (I).$$

21. The method according to claim 20, wherein at least one of the inks contains a pigment and a water-soluble dye.

22. The method according to claim 21, wherein each of the inks contains a pigment and a water-soluble dye.

23. The method according to claim 22, wherein the weight ratio of the pigment to the water-soluble dye in the ink is from 10:1 to 1:5.

24. The method according to claim 23, wherein the weight ratio of the pigment to the water-soluble dye in the ink is from 5:1 to 1:5.

25. The method according to claim 22, wherein the inks are different from each other in the ratio of the pigment to the water-soluble dye.

26. The method according to claim 20, wherein the recording medium is a transparent recording medium.

27. The method according to claim 21, wherein the pigment is carbon black, and the water-soluble dye has a carboxyl group as a group for being solubilized in water.

28. The method according to claim 21, wherein the water-soluble dye is a dye represented by the structural formula (a);

(a)

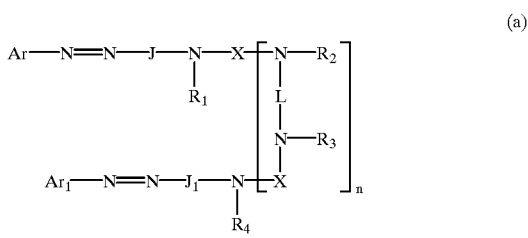

wherein Ar and $Ar_1$ are independently an aryl or substituted aryl group, at least one of Ar and $Ar_1$ has at least one substituent group selected from COOH and COSH, n is 0 or 1, J and $J_1$ are independently a bonding group selected from the group consisting of the general formulae (1) to (3);

(1)

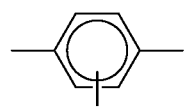

(2)

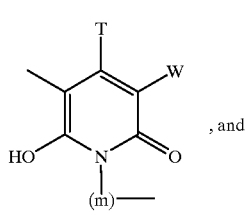

, and (3)

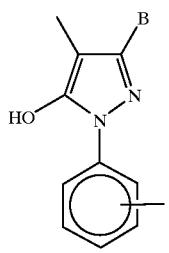

in which $R_5$ is selected from the group consisting of hydrogen, alkyl groups, substituted alkyl groups, alkoxy groups, halogens, CN, a ureido group and $NHCOR_6$ wherein $R_6$ is hydrogen, or an alkyl, substituted alkyl, aryl, substituted aryl, aralkyl or substituted aralkyl group, T is an alkyl group, W is selected from the group consisting of hydrogen, CN, $CONR_{10}R_{11}$ wherein $R_{10}$ and $R_{11}$ are independently hydrogen, or an alkyl or substituted alkyl group; pyridinium and COOH, m is an alkylene chain having 2 to 8 carbon atoms, and B is hydrogen, or an alkyl or COOH group, $R_1$, $R_2$, $R_3$ and $R_4$ are independently hydrogen, or an alkyl or substituted alkyl group, L is a divalent bonding group, X is a carbonyl group or a bonding group selected from the group consisting of the general formulae (4) to (6);

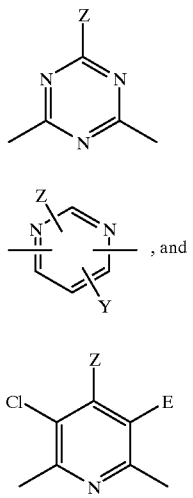

in which Z is $OR_7$, $SR_7$ or $NR_8R_9$ wherein $R_7$, $R_8$ and $R_9$ are independently hydrogen, or an alkenyl, substituted alkenyl, alkyl, substituted alkyl, aryl, substituted aryl, aralkyl or substituted aralkyl group, or $R_8$ and $R_9$ may form a 5- or 6-membered ring together with the nitrogen atom to which they are bonded, Y is hydrogen, chlorine, CN or Z, and E is chlorine or CN, with the proviso that when a compound of the formula (a) has no $SO_3H$ group, the compound has at least two groups selected from COOH and COSH, or when a compound of the formula (a) has one or more $SO_3H$ groups, the compound has groups seleted from COOH and COSH of at least the same number as the number of $SO_3H$ groups.

29. The method according to claim 28, wherein the dye represented by the formula (a) is any one of the following Compounds 1 to 11;

Illustrative Compound 1:

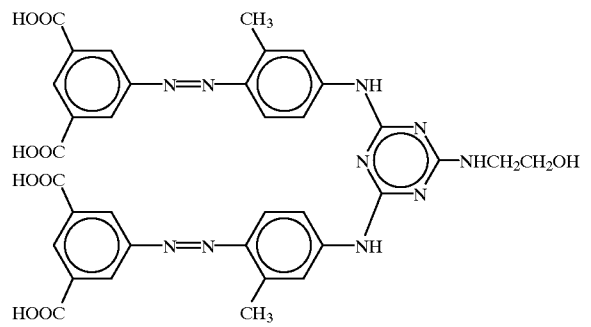

Illustrative Compound 2:

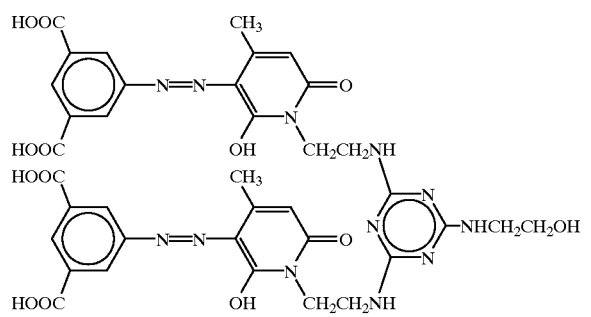

Illustrative Compound 3:

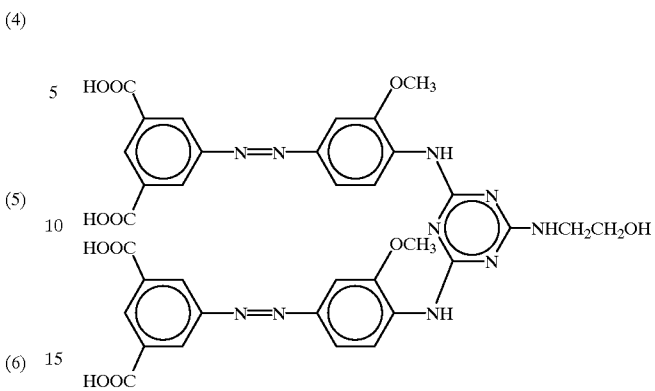

Illustrative Compound 4:

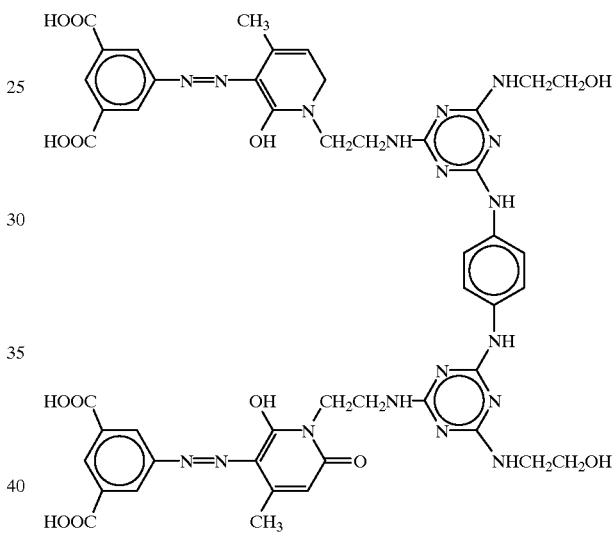

Illustrative Compound 5:

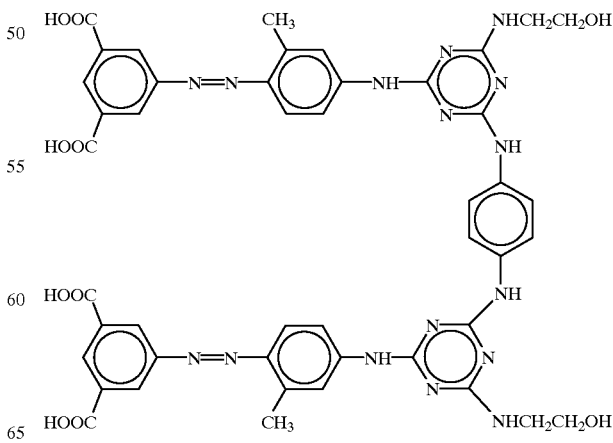

Illustrative Compound 6:

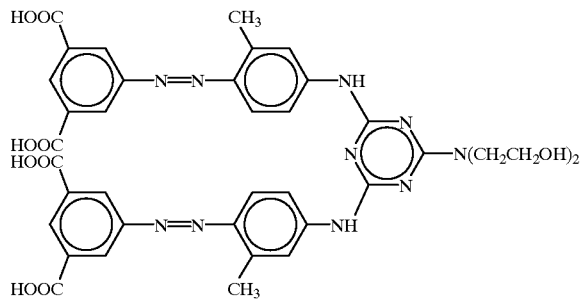

Illustrative compound 7:

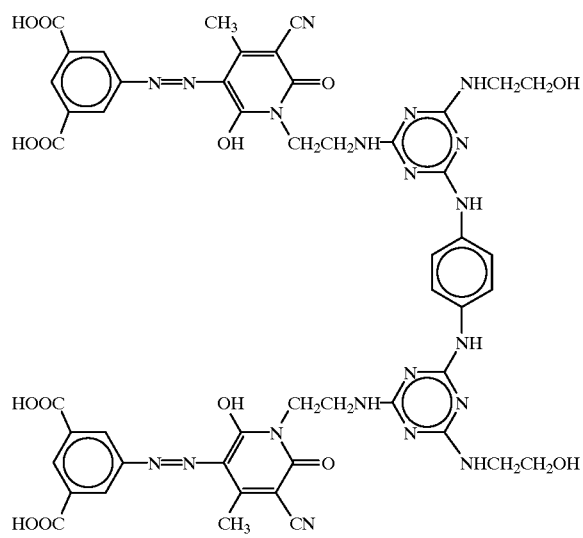

Illustrative Compound 8:

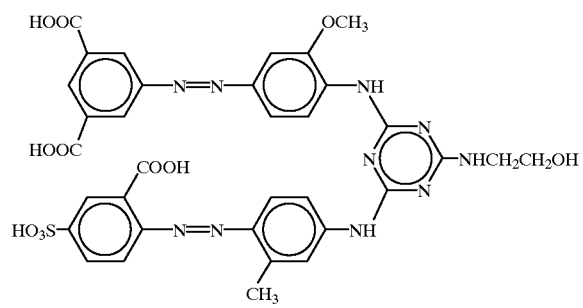

Illustrative Compound 9:

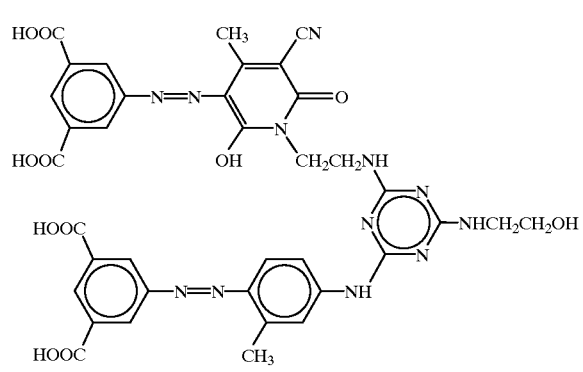

Illustrative Compound 10:

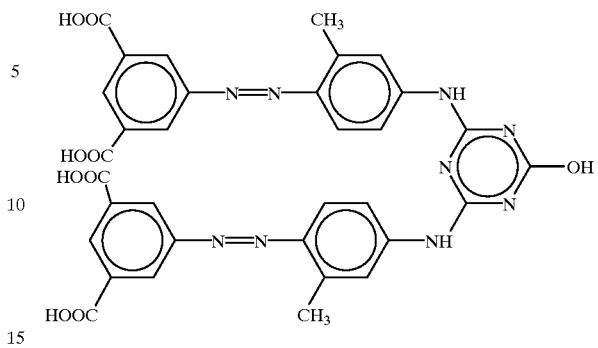

Illustrative Compound 11:

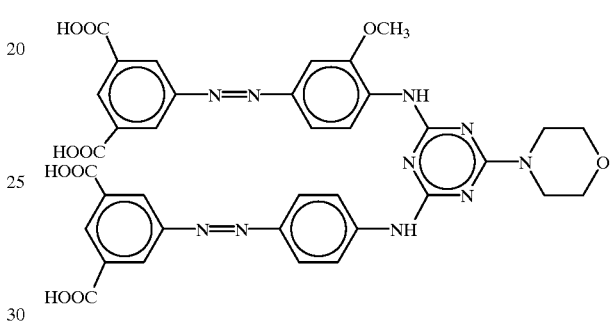

30. The method according to claim 21, wherein the water-soluble dye is a dye represented by the structural formula (b);

$$Ar_1-N=N-J_2-X-(NR_{1b}-L-NR_{2b}-X)_n-J_2-N=N-Ar_2 \quad (b)$$

wherein $J_2$ represents a formula (7);

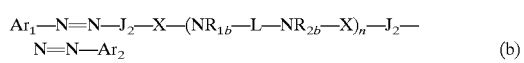

$Ar_1$ and $Ar_2$ are independently an aryl or substituted aryl group, at least one of $Ar_1$ and $Ar_2$ has at least one substituent group selected from the group consisting of COOH and COSH, $R_{1b}$ and $R_{2b}$ are independently hydrogen, or an alkyl, substituted alkyl, alkenyl or substituted alkenyl group, L is a divalent bonding group, n is 0 or 1, and X is a carbonyl group or a bonding group selected from the group consisting of the general formulae (8) to (10);

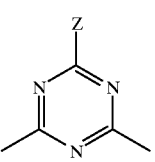

(8)

-continued

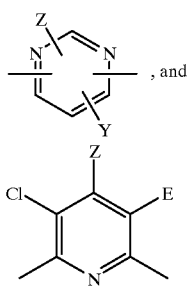
(9)

(10)

in which Z is $OR_7$, $SR_7$ or $NR_8R_9$ wherein $R_7$, $R_8$ and $R_9$ are independently hydrogen, or an alkyl, substituted alkyl, alkenyl, substituted alkenyl, aryl, substituted aryl, aralkyl or substituted aralkyl group, or $R_8$ and $R_9$ may form a 5- or 6-membered ring together with the nitrogen atom to which they are bonded, Y is hydrogen, chlorine or Z, and E is chlorine or CN, with the proviso that a compound represented by the formula (b) has groups selected from COOH and COSH of at least the same number of $SO_3H$ groups.

31. The method according to claim 30, wherein the dye represented by the formula (b) is any one of the following Compounds 12 to 19;

Illustrative Compound 12:

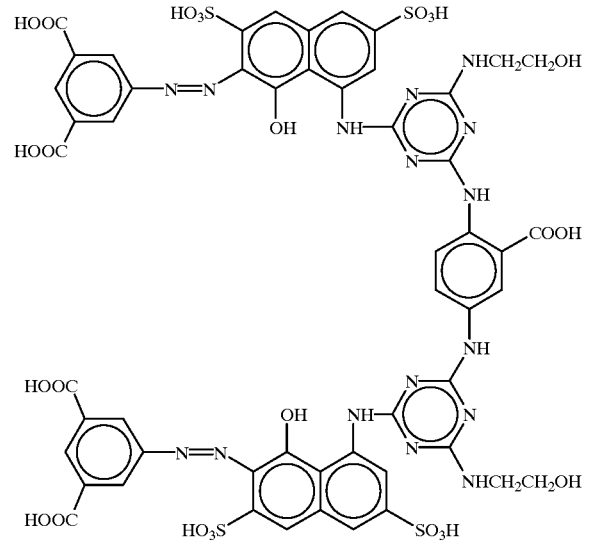

Illustrative Compound 13:

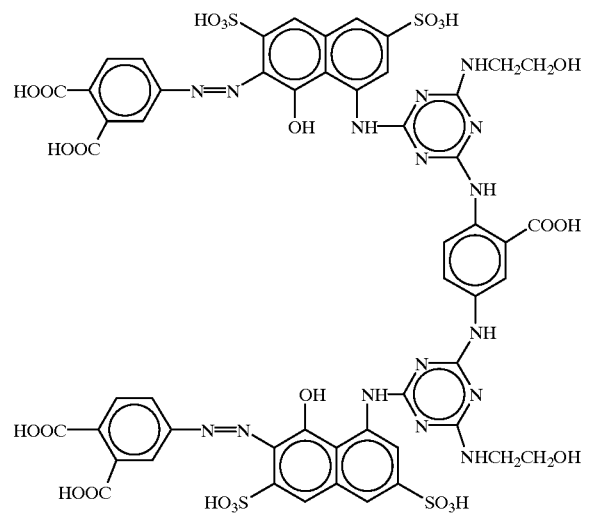

Illustrative Compound 14:

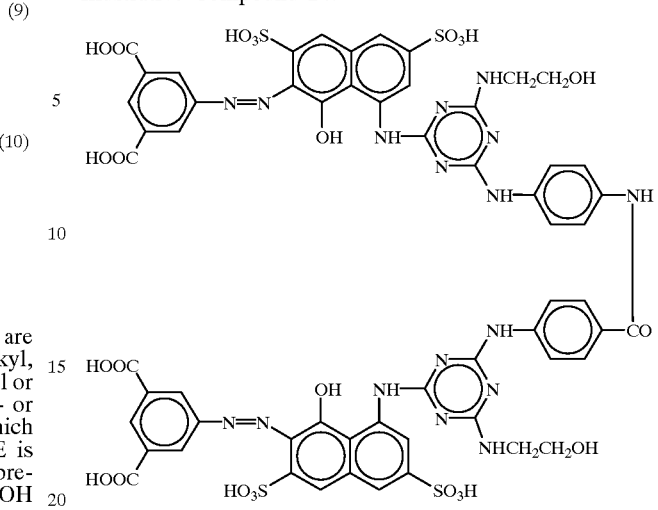

Illustrative Compound 15:

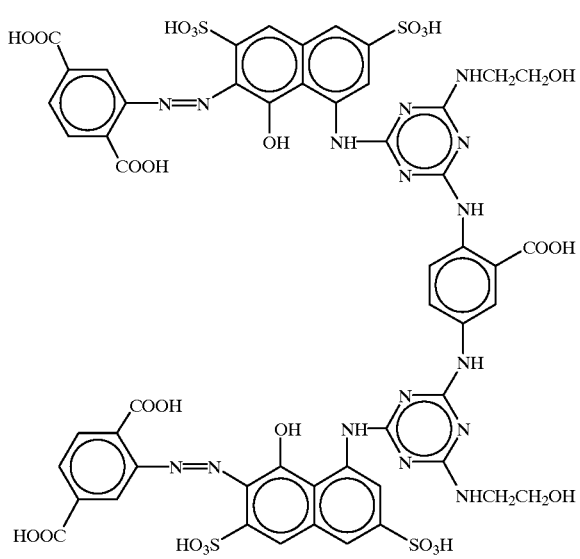

Illustrative Compound 16:

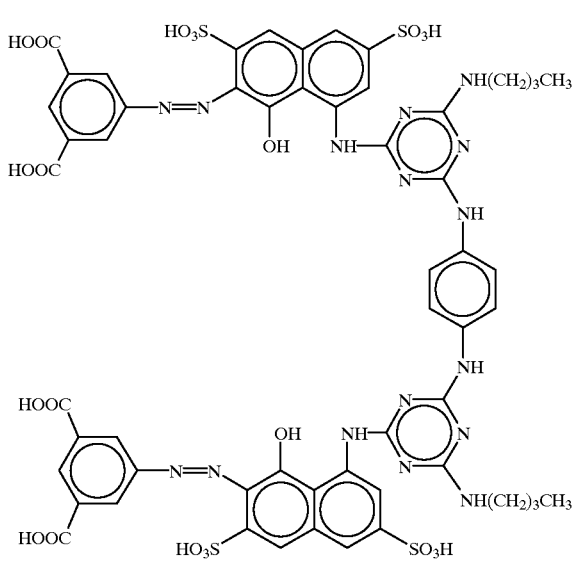

Illustrative Compound 17:

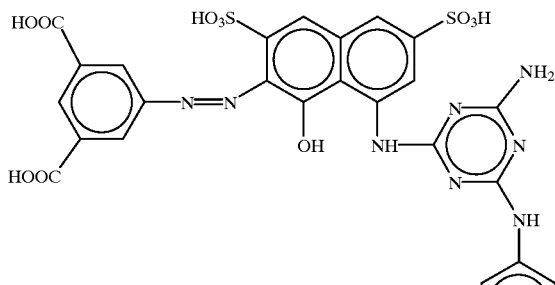

Illustrative Compound 18:

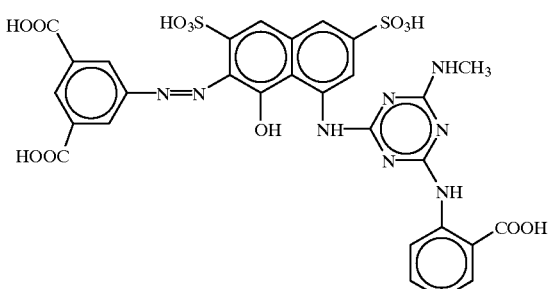

Illustrative Compound 19:

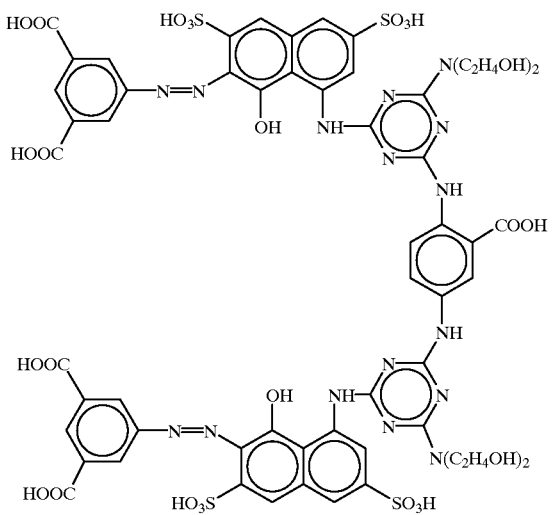

32. The method according to claim 21, wherein the water-soluble dye is a dye represented by the structural formula (c);

$$Pc(SO_3H)_t(SO_2—NR_{1c}—L—NR_{2c}—X—NR_{3c}—G)_q \qquad (C)$$

wherein Pc is a phthalocyanine nucleus, $R_{1c}$, $R_{2c}$ and $R_{3c}$ are independently hydrogen, or an alkyl, substituted alkyl, alkenyl, substituted alkenyl, aralkyl or substituted aralkyl group, L is a divalent bonding group, X is a carbonyl group or a bonding group selected from the group consisting of the general formulae (11) to (13);

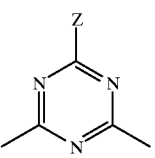
(11)

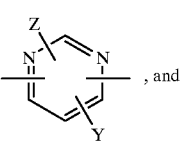
, and (12)

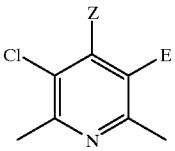
(13)

in which Z is $OR_{12}$, $SR_{12}$ or $NR_{13}R_{14}$ wherein $R_{12}$, $R_{13}$ and $R_{14}$ are independently hydrogen, or an alkyl, substituted alkyl, aryl, substituted aryl, aralkyl or substituted aralkyl group, or $R_{13}$ and $R_{14}$ may form a 5- or 6-membered ring together with the nitrogen atom to which they are bonded, Y is hydrogen, chlorine or Z, and E is chlorine or CN, G is a colorless organic group substituted by 1 or 2 groups selected from COSH and COOH, and (t+q) is 3 or 4, with the proviso that a compound represented by the formula (c) has at least one $SO_3H$ group and groups selected from COSH and COOH of the same number as the number of $SO_3H$ groups.

33. The method according to claim 32, wherein the dye represented by the formula (c) is any one of the following Compounds 20 to 26;

Illustrative Compound 20:

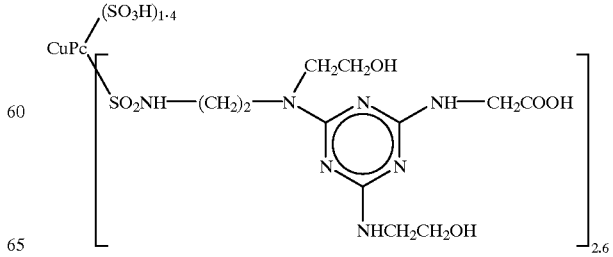

Illustrative Compound 21:

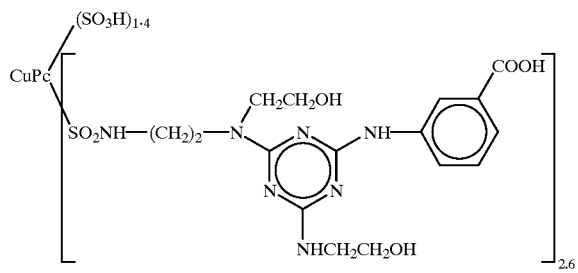

Illustrative Compound 22:

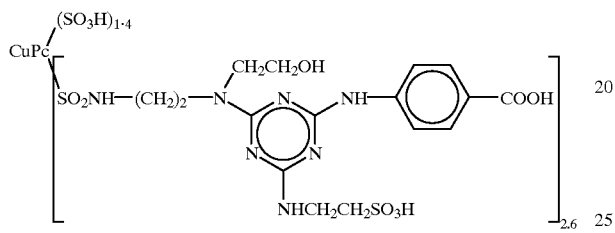

Illustrative Compound 23:

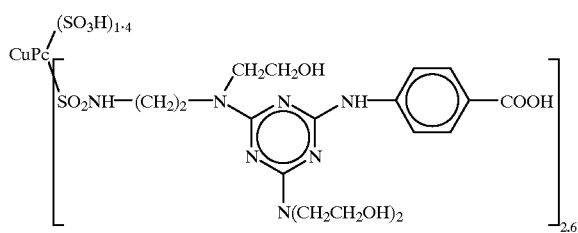

Illustrative Compound 24:

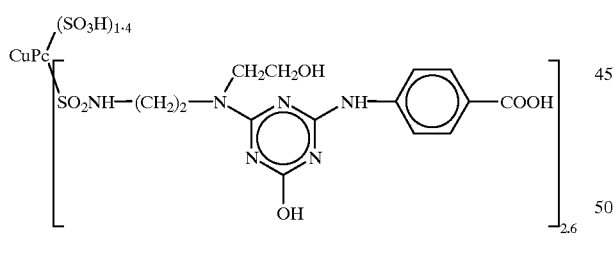

Illustrative Compound 25:

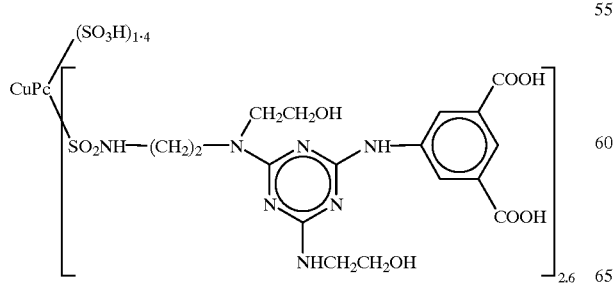

Illustrative Compound 26:

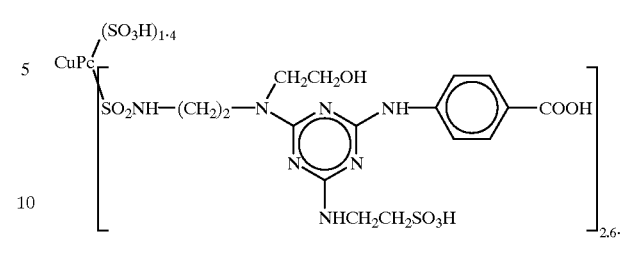

34. The method according to claim 21, wherein the water-soluble dye is a dye represented by the structural formula

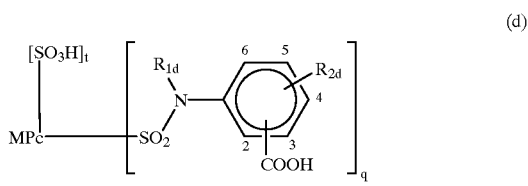

(d)

wherein M is a metal cation or hydrogen, Pc is a trivalent or tetravalent phthalocyanine group, $R_{1d}$ is hydrogen, or an alkyl, substituted alkyl, alkenyl, substituted alkenyl, aralkyl or substituted aralkyl group, $R_{2d}$ is hydrogen, an alkyl group, halogen, an alkoxy group or an amino group which may be substituted, and (t+q) is 3 or 4, with the proviso that COOH is bonded to a 2, 3, 5 or 6 position in the formula (d).

35. The method according to claim 34, wherein the dye represented by the formula (d) is any one of the following Compounds 27 to 29;

Illustrative Compound 27:

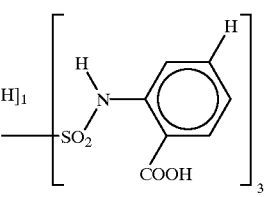

Illustrative Compound 28:

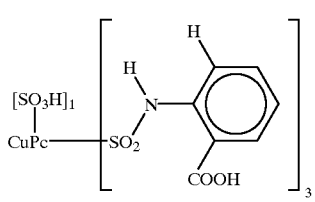

Illustrative Compound 29:
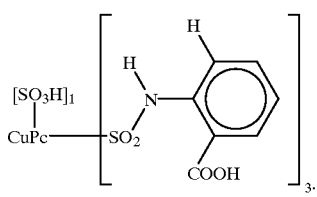
36. The method according to claim 21, wherein the water-soluble dye is a dye represented by the structural formula (e);
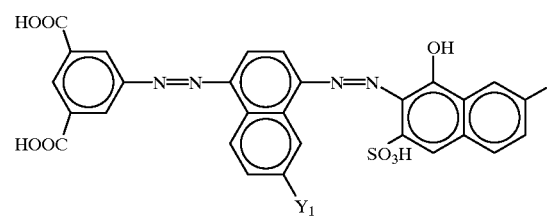
(e)
wherein $Y_1$ is hydrogen or $SO_3H$.
37. The method according to claim 36, wherein the dye represented by the formula (e) is either one of the following Compounds 30 and 31;
Illustrative Compound 30:
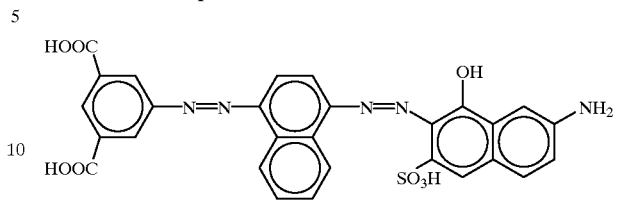
Illustrative Compound 31:
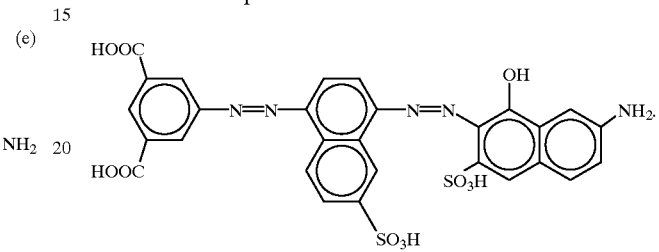
* * * * *

UNITED STATES PATENT AND TRADEMARK OFFICE
CERTIFICATE OF CORRECTION

PATENT NO. : 6,342,096 B1
DATED : January 29, 2002
INVENTOR(S) : Yutaka Kurabayashi It is certified that error appears in the above-identified patent and that said Letters Patent is hereby corrected as shown below:

Column 4,
Line 1, "and" should be deleted.

Column 6,
Line 67, "forming" should read -- form --.

Column 11,
Line 26, "Rg may forming" should read -- $R_9$ may form --.

Column 15,
Line 20, "forming" should read -- form --.

Column 19,
Line 25, "more" should read -- better --.

Column 39,
Line 32, "seleted" should read -- selected --.

Signed and Sealed this

Twenty-fifth Day of March, 2003

JAMES E. ROGAN
*Director of the United States Patent and Trademark Office*